US012212095B2

(12) United States Patent
Murray, III et al.

(10) Patent No.: US 12,212,095 B2
(45) Date of Patent: Jan. 28, 2025

(54) APPARATUS AND METHODS FOR INSULATING TERMINALS OF AN ELECTRICAL DEVICE

(71) Applicant: EPG—ELECTRICAL PROTECTION GROUP LLC, Scottsdale, AZ (US)

(72) Inventors: Richard A. Murray, III, Glendale, AZ (US); Bradley S. Smith, Chandler, AZ (US)

(73) Assignee: EPG—ELECTRICAL PROTECTION GROUP LLC, Scottsdale, AZ (US)

( * ) Notice: Subject to any disclaimer, the term of this patent is extended or adjusted under 35 U.S.C. 154(b) by 0 days.

(21) Appl. No.: 18/497,364

(22) Filed: Oct. 30, 2023

(65) Prior Publication Data

US 2024/0079816 A1 Mar. 7, 2024

Related U.S. Application Data

(63) Continuation of application No. 17/307,612, filed on May 4, 2021, now Pat. No. 11,837,817.

(51) Int. Cl.

*H01R 13/52* (2006.01)
*H01R 13/50* (2006.01)
*H01R 25/00* (2006.01)

(52) U.S. Cl.

CPC ....... *H01R 13/5213* (2013.01); *H01R 13/501* (2013.01); *H01R 25/006* (2013.01)

(58) Field of Classification Search

None

See application file for complete search history.

(56) References Cited

U.S. PATENT DOCUMENTS

| | | | | |
|---|---|---|---|---|
| 4,008,419 A | | 2/1977 | Stearley | |
| 4,554,616 A | | 11/1985 | McIntosh | |
| 4,588,851 A | | 5/1986 | Turner | |
| 4,660,912 A | * | 4/1987 | Tomek | H01R 13/447 174/67 |
| 4,801,271 A | * | 1/1989 | Piper | H01R 13/443 174/67 |
| 5,293,844 A | | 5/1994 | Threatt | |
| 5,564,944 A | * | 10/1996 | Fukuda | H01R 13/506 439/456 |
| 5,675,126 A | * | 10/1997 | Halvorsen | H01R 13/447 174/67 |
| 5,824,948 A | | 10/1998 | Berg | |
| 5,936,199 A | | 8/1999 | Lutz | |
| 5,998,734 A | | 12/1999 | Kerestan et al. | |

(Continued)

FOREIGN PATENT DOCUMENTS

DE 19728608 C2 * 7/1999 ............ H01M 12/02

*Primary Examiner* — Tho D Ta

(74) *Attorney, Agent, or Firm* — Parsons & Goltry, PLLC; Michael W. Goltry; Robert A. Parsons

(57) ABSTRACT

Apparatus for opposed terminals of an electrical device includes magnetic material carried by a cover formed of an electrically insulative material and concurrently covering the terminals, and a magnetic attraction between the magnetic material and the terminals magnetically coupling the cover to the terminals. In another embodiment, the apparatus includes covers formed of an electrically insulative material and connected by hinges to the electrical device for movement between open positions away from the terminals and closed positions covering the respective terminals.

9 Claims, 18 Drawing Sheets

(56) References Cited

U.S. PATENT DOCUMENTS

| | | | | |
|---|---|---|---|---|
| 6,796,814 | B1 * | 9/2004 | Handschke | H01R 13/5213 174/67 |
| 7,077,706 | B1 | 7/2006 | Yang | |
| 7,273,984 | B2 * | 9/2007 | Murphy | H02G 15/18 174/92 |
| 7,598,452 | B1 * | 10/2009 | Shotey | H01R 13/652 174/67 |
| 8,133,064 | B2 | 3/2012 | Nishimura | |
| 8,435,041 | B2 | 5/2013 | Holland | |
| 8,668,347 | B2 | 3/2014 | Ebeling | |
| 9,130,295 | B2 * | 9/2015 | Nguyen Nhu | H01R 13/501 |
| 2006/0110986 | A1 * | 5/2006 | King, Jr. | H01R 4/62 439/709 |
| 2006/0274461 | A1 | 12/2006 | Ochoa et al. | |
| 2018/0309248 | A1 | 10/2018 | Chen | |
| 2021/0079686 | A1 * | 3/2021 | Pedersen | E05B 17/183 |

* cited by examiner

APPARATUS AND METHODS FOR INSULATING TERMINALS OF AN ELECTRICAL DEVICE

FIELD OF THE INVENTION

The present invention relates generally electrical devices having terminals and, more particularly, to terminal covers configured to insulate terminals of an electrical device.

BACKGROUND OF THE INVENTION

Buildings such as homes, offices, retail stores, restaurants, and the like customarily incorporate electrical devices installed in outlet boxes mounted in the building's walls. The electrical devices typically include outlets used to connect electrical appliances to the building's alternating current power supply and switches used to open and close electrical circuits to the building's lights, ceiling fans, outlets, and other appliances.

An electrical device, whether an outlet or a switch, has exposed terminals of metal, usually screws, to secure and electrically connect the electrical wires wired to the building's power supply. When the electrical device is powered, shorting can occur between the terminals and an outlet box constructed of metal. The potential also exists for electric shock or injury to an electrician or other individual servicing the electrical device by inadvertently touching the energized terminals and a grounded source simultaneously. Although skilled artisans have devoted considerable effort toward ways to cover the terminals, existing covers are expensive, difficult to install, and structurally complex. Given these and other deficiencies inherent in the art, the need for continued improvement is evident.

SUMMARY OF THE INVENTION

According to the principle of the invention, apparatus for a terminal of an electrical device includes magnetic material carried by a cover formed of an electrically insulative material and covering the terminal, and a magnetic attraction between the magnetic material and the terminal magnetically coupling the cover to the terminal. The cover additionally includes a profile laterally shielding the terminal. The magnetic material is exposed and is adhered adhesively to the cover.

According to the principle of the invention, apparatus for opposed first and second terminals of an electrical device includes magnetic material carried by a cover formed of an electrically insulative material and concurrently covering the first and second terminals, and a magnetic attraction between the magnetic material and the first and second terminals magnetically coupling the cover to the first and second terminals. The cover includes profiles one laterally shielding the first terminal and another laterally shielding the second terminal. The magnetic material is exposed and is adhered adhesively to the cover.

According to the principle of the invention, apparatus for a terminal of an electrical device includes a cover formed of an electrically insulative material and connected by a hinge to the electrical device for movement between an open position away from the terminal and a closed position covering the terminal. The electrical device includes a chassis formed of the electrically insulative material, and the hinge is a living hinge made from the electrically insulative material of the chassis and the cover the living hinge connects.

According to the principle of the invention, apparatus for a first terminal and a second terminal of an electrical device includes a first cover formed of an electrically insulative material and connected by a first hinge to the electrical device for movement between an open position away from the first terminal and a closed position covering the first terminal, and a second cover formed of the electrically insulative material and connected by a second hinge to the electrical device for movement between an open position away from the second terminal and a closed position covering the second terminal. The electrical device includes a chassis formed of the electrically insulative material, the first hinge is a living hinge made from the electrically insulative material of the chassis and the first cover the living hinge connects, and the second hinge is a living hinge made from the electrically insulative material of the chassis and the second cover the living hinge connects.

According to the principle of the invention, apparatus for a first terminal and a second terminal of an electrical device includes a first cover formed of an electrically insulative material and connected by a first hinge to the electrical device for movement between an open position away from the first terminal and a closed position covering the first terminal, a second cover formed of the electrically insulative material and connected by a second hinge to the electrical device for movement between an open position away from the second terminal and a closed position covering the second terminal, an engagement element carried by the first cover, and a complemental engagement element carried by the second cover. The engagement element is configured to detachably engage the complemental engagement element when the first cover and the second cover are in the closed positions thereof. The first cover includes a proximal extremity connected by the first hinge to the electrical device and a distal extremity, the second cover includes a proximal extremity connected by the second hinge to the electrical device and a distal extremity, the engagement element is carried by the first cover proximate to its distal extremity, and the complemental engagement element is carried by the second cover proximate to its distal extremity. The electrical device includes a chassis formed of the electrically insulative material, the first hinge is a first living hinge made from the electrically insulative material of the chassis and the first cover the first living hinge connects, and the second hinge is a second living hinge made from the electrically insulative material of the chassis and the second cover the second living hinge connects.

BRIEF DESCRIPTION OF THE DRAWINGS

Specific objects and advantages of the invention will become apparent to those skilled in the art from the following detailed description of illustrative embodiments thereof, taken in conjunction with the drawings in which.

DETAILED DESCRIPTION

Disclosed are inexpensive and easy to implement apparatus for terminals of an electrical device. The apparatus includes magnetic material carried by a cover formed of an electrically insulative material. The cover concurrently covers the terminals, and a magnetic attraction between the magnetic material and the terminals magnetically couples the cover to the terminals. In another embodiment, the apparatus includes covers formed of an electrically insulative material and connected hingedly directly to the electrical device for movement between open positions away from the respective terminals and closed positions covering the respective terminals.

Figure 1:
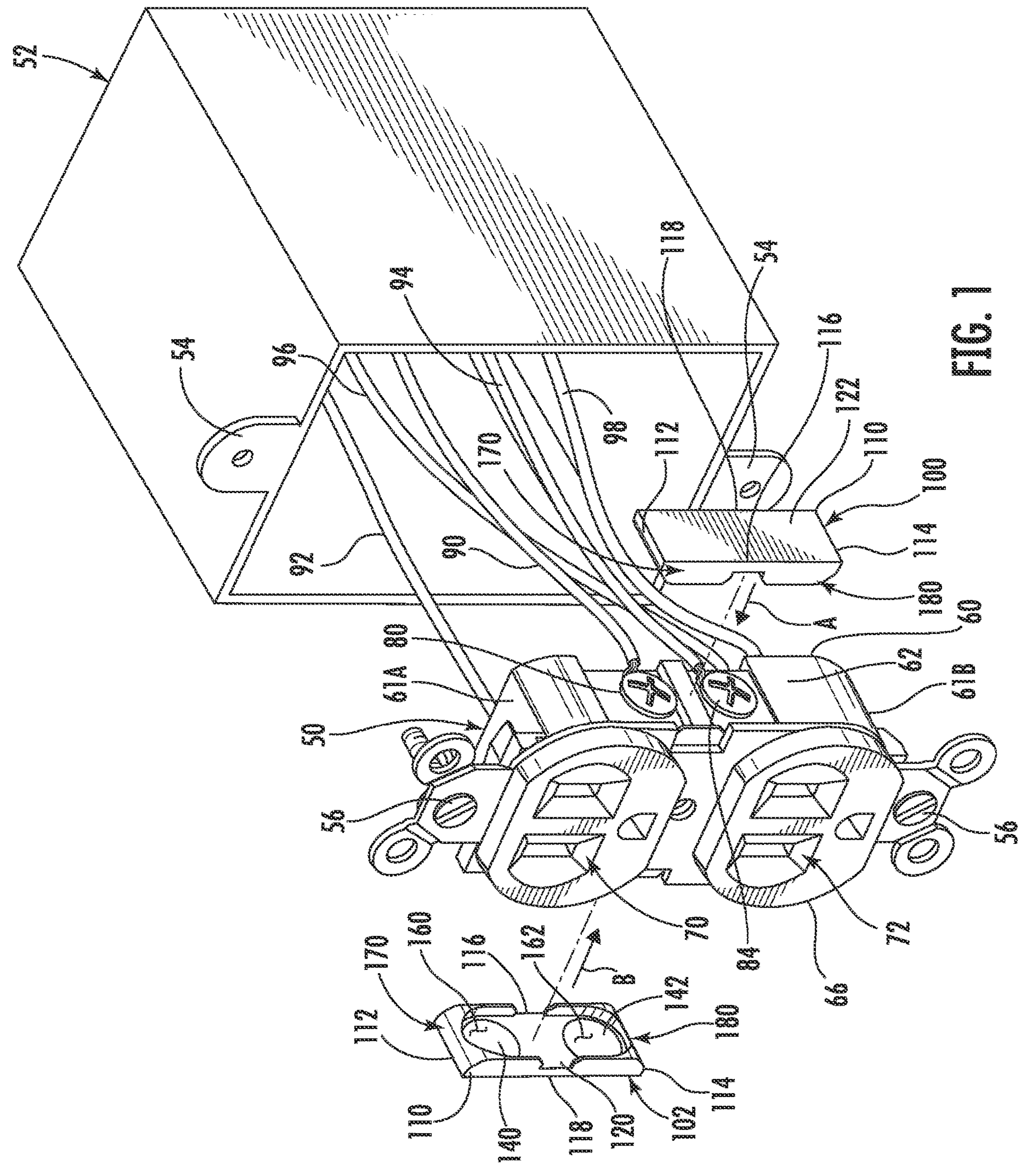
FIGS. 1 and 2 are perspective views of insulative covers spaced apart from electrically wired terminals on either side of an electrical device withdrawn from an outlet box.
Figure 2:
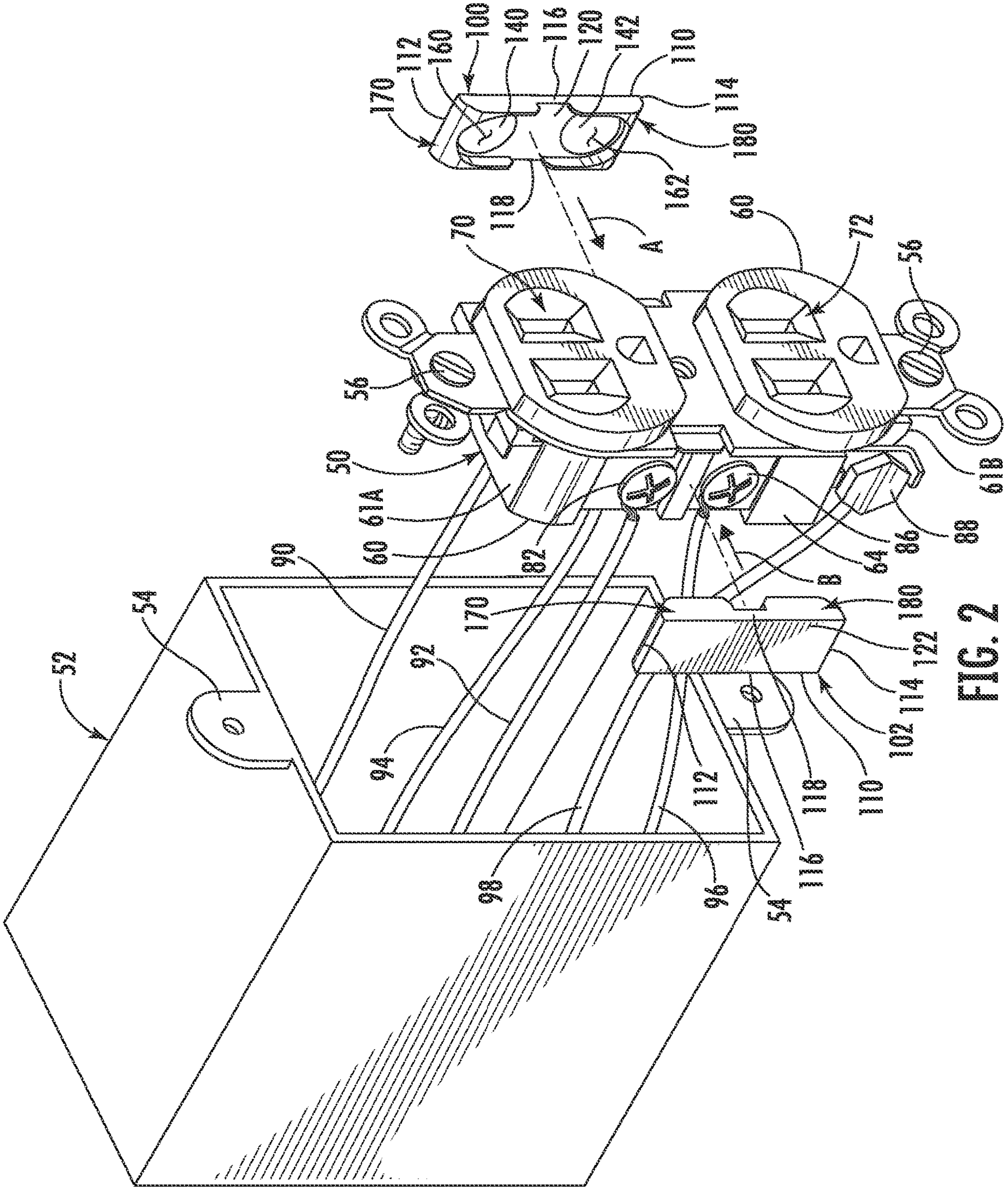
Figure 3:
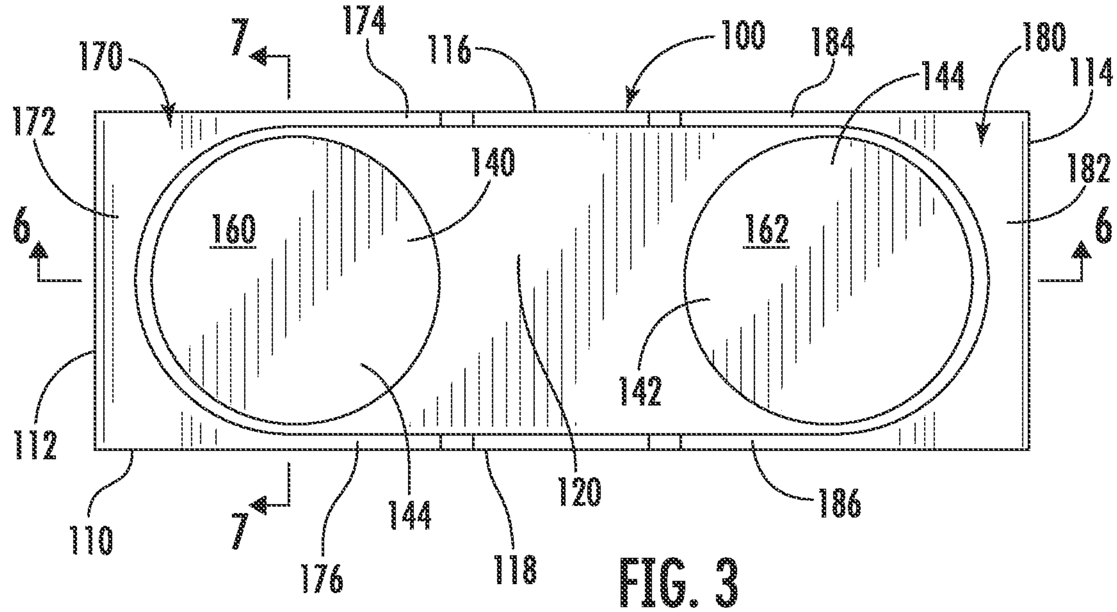
FIG. 3 is a top plan view of one of the insulative covers of FIGS. 1 and 2.
Figure 4:
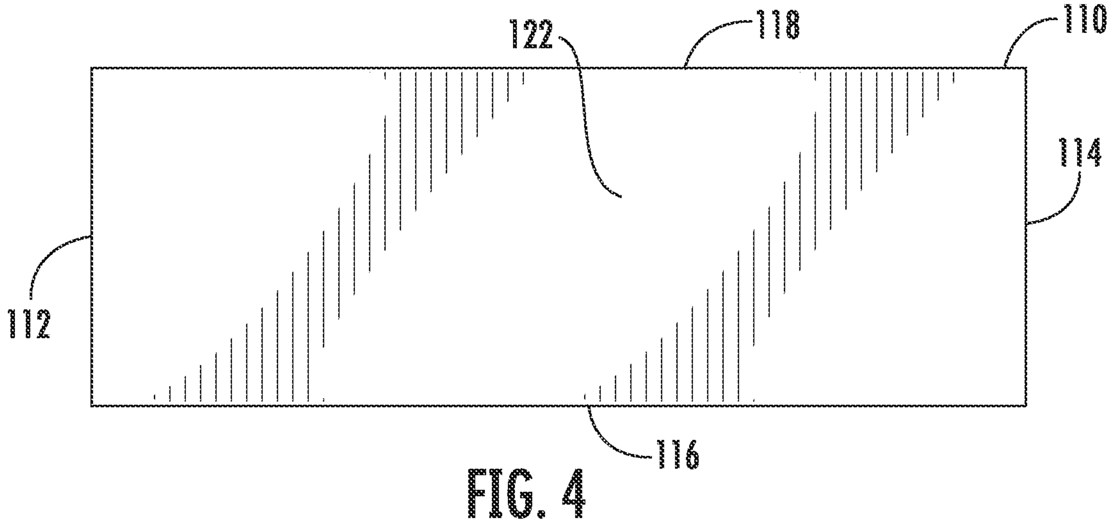
FIG. 4 is a bottom plan view of the embodiment of FIG. 3.
Figure 5:
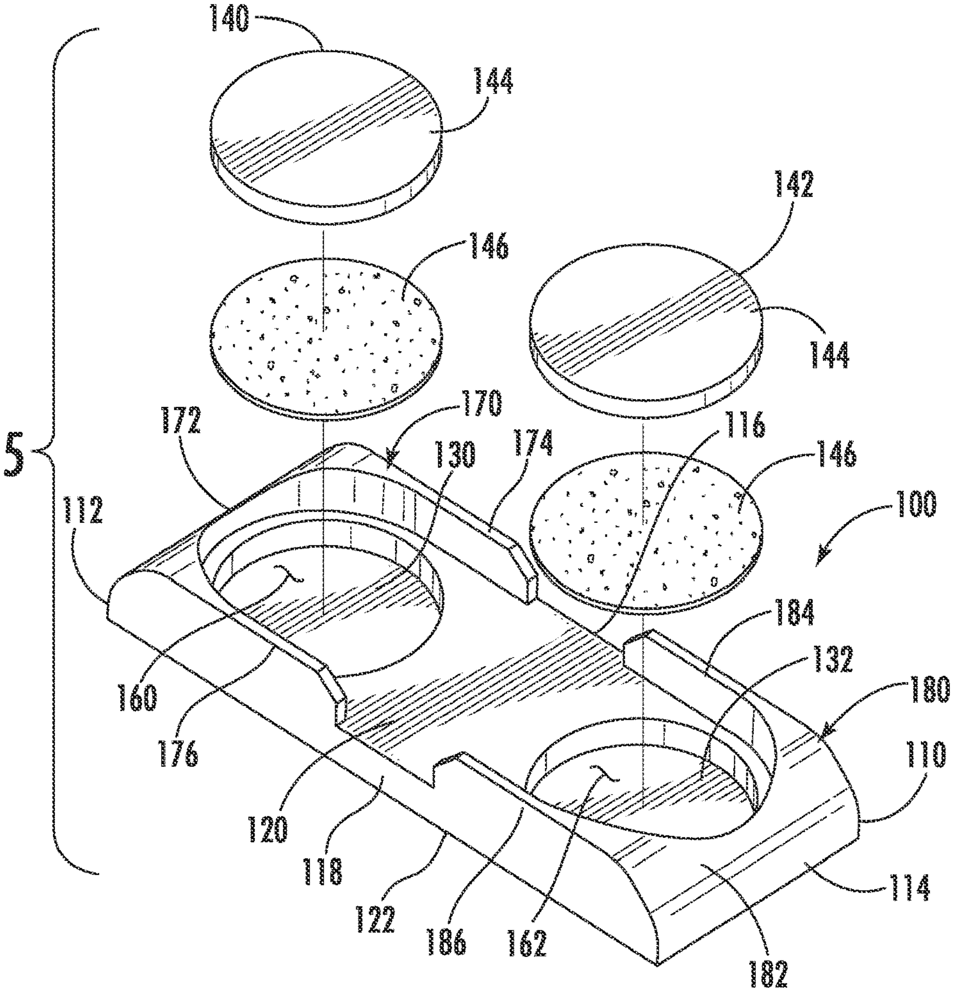
FIG. 5 is an exploded perspective view of the embodiment of FIG. 3.
Figure 6:
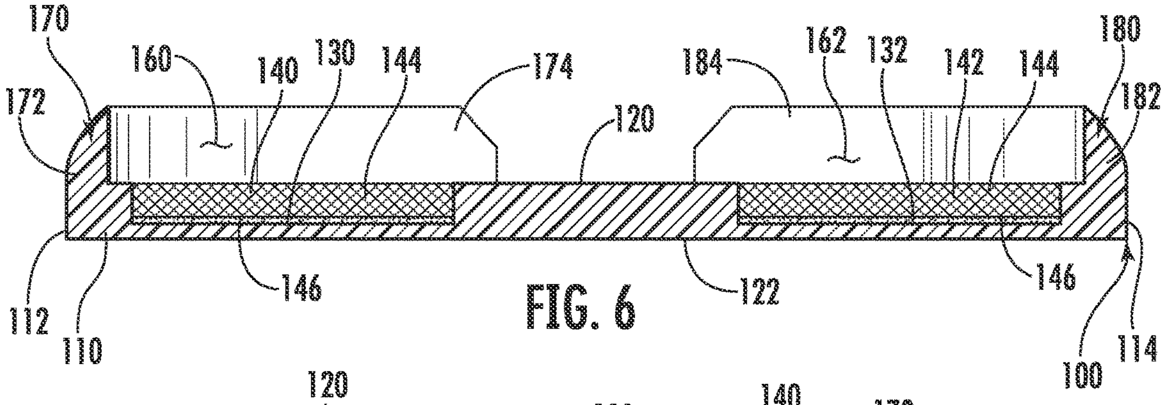
FIG. 6 is a section view taken along line 6-6 of FIG. 3.
Figure 7:
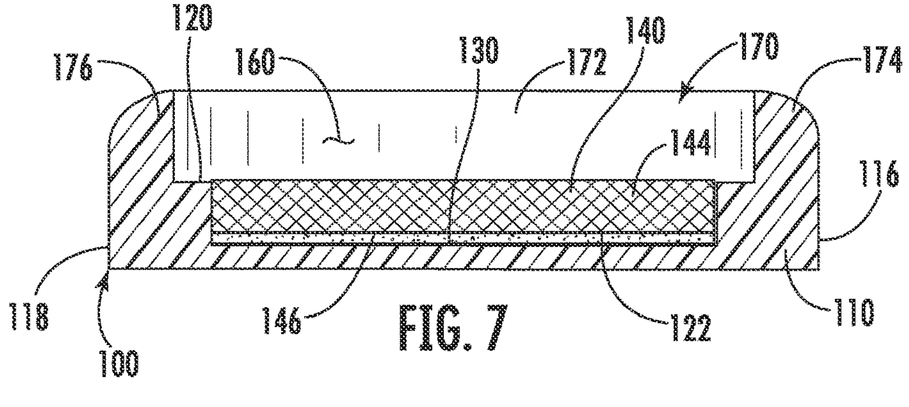
FIG. 7 is a section view taken along line 7-7 of FIG. 3.
Figure 14:
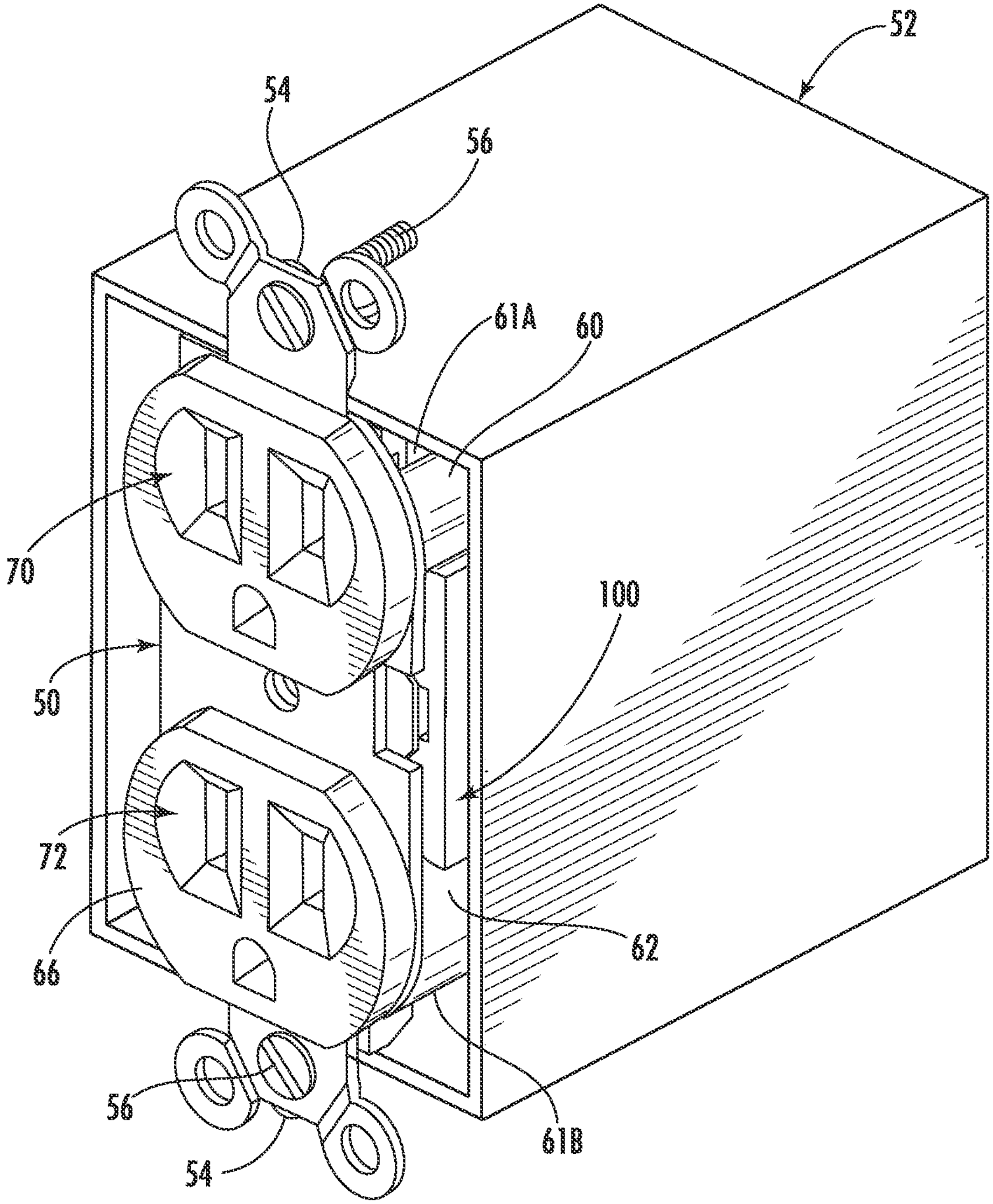
FIGS. 14 and 15 are perspective views corresponding to FIGS. 8 and 9, respectively, illustrating the electrical device mounted in the junction box.
Figure 15:
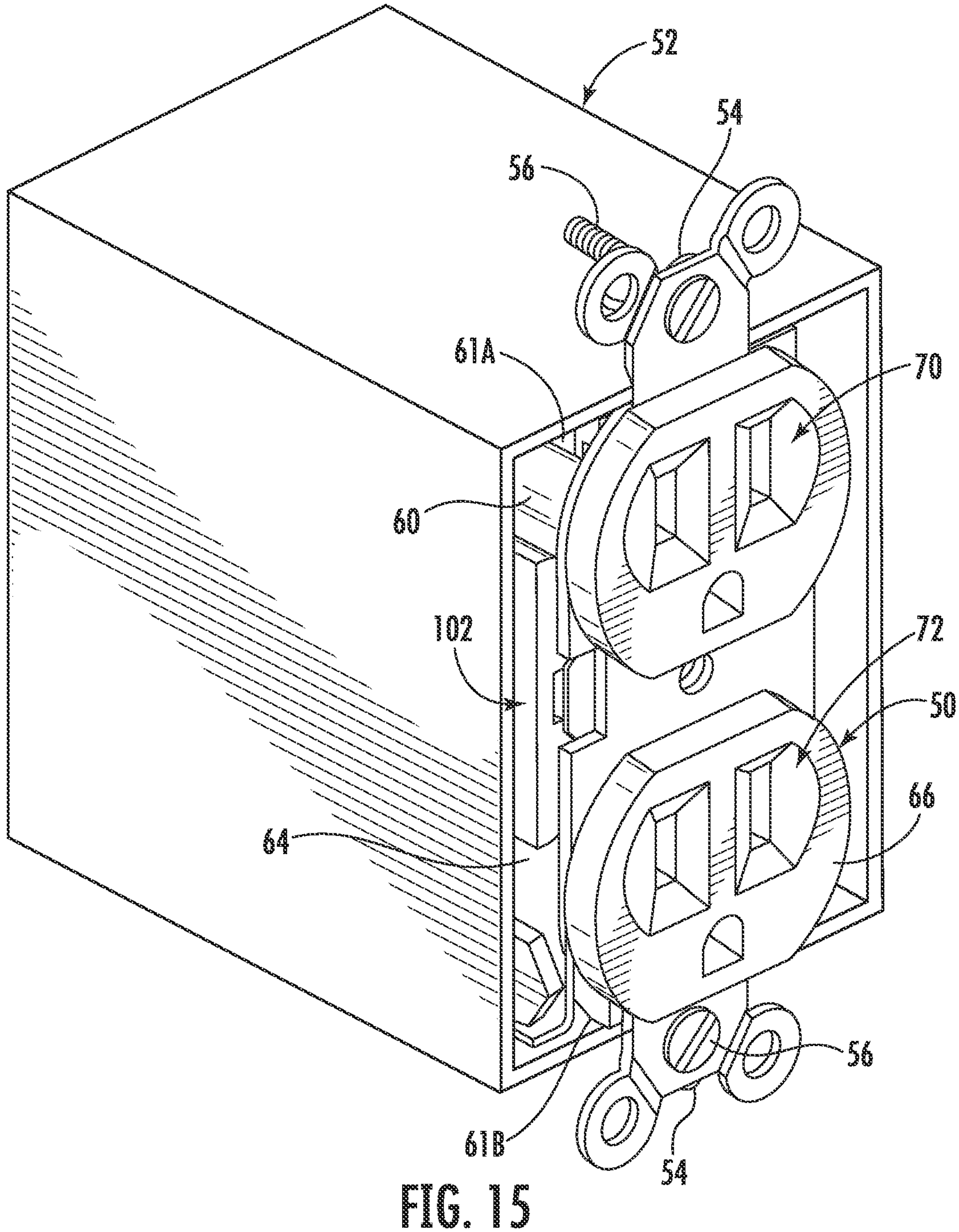

Turning now to the drawings, in which like reference characters indicate corresponding elements throughout the several views, FIGS. 1 and 2 illustrate electrical device 50 and outlet or junction box 52. Outlet box 52 is of standard construction and configured to be mounted conventionally in a building's wall. The terminals of electrical device 50 are configured to be hardwired to the building's alternating current power supply and installed in outlet box 52 as shown in FIGS. 14 and 15 and secured to its standard attachment points 54, exteriorly-projecting lugs in this example, with suitable screws 56 according to standard practice. In this example, electrical device 50 is a standard and readily available duplex receptacle including chassis or body 60 of plastic and cover body or face 66 of ceramic or plastic. Chassis 60 has opposed upper and lower ends 61A and 61B, opposed sides 62 and 64. Cover body 66 has with two standard sockets denoted at 70 and 72, respectively. Sockets 70 and 72 are spaced apart vertically, and while are standard three-prong sockets can each be any suitable socket format. Vertically spaced-apart screw-type terminals 80 and 82 exposed on the respective sides 62 and 64 of chassis 60 service socket 70. Vertically spaced-apart screw-type terminals 84 and 86 exposed on the respective sides 62 and 64 of chassis 60 service socket 72. Terminals 80, 82, 84, and 86 are identical. A pair of electrical conductors or wires 90 and 92 hardwired to the respective terminals 80 and 82 electrically service socket 70. A pair of electrical conductors or wires 94 and 96 hardwired to the respective terminals 84 and 86 electrically service socket 72. An exposed ground terminal 88 of metal in FIG. 2 is conventionally connected in parallel with the ground conductors of the respective plugs 70 and 72. A ground conductor or wire 98 hardwired to ground terminal 88 grounds sockets 70 and 72 through the respective ground conductors.

Electrical device 50 is withdrawn from outlet box 52 in FIGS. 1 and 2. Accidental contact of exposed terminals 80 and 84 with outlet box 52 when fashioned of metal during the installation, removal or servicing of electrical device 50 can cause shorting. The potential also exists for electric shock or injury to an electrician or other individual servicing the electrical device 50 by inadvertently touching the energized terminals 80 and 84 and a grounded source simultaneously. Likewise, accidental contact of exposed terminals 82 and 86 with outlet box 52 when fashioned of metal during the installation, removal, or servicing of electrical device 50 can cause shorting. The potential also exists for electric shock or injury to an electrician or other individual servicing the electrical device 50 by inadvertently touching the energized terminals 82 and 86 and a grounded source simultaneously. According to the invention, insulative covers 100 and 102 are configured to electrically isolate the exposed terminals, one for terminals 80 and 84 at side 62 and the other for terminals 82 and 86 at side 64, to forestall the possibility of the described shorting and electrical shock.

Figure 8:
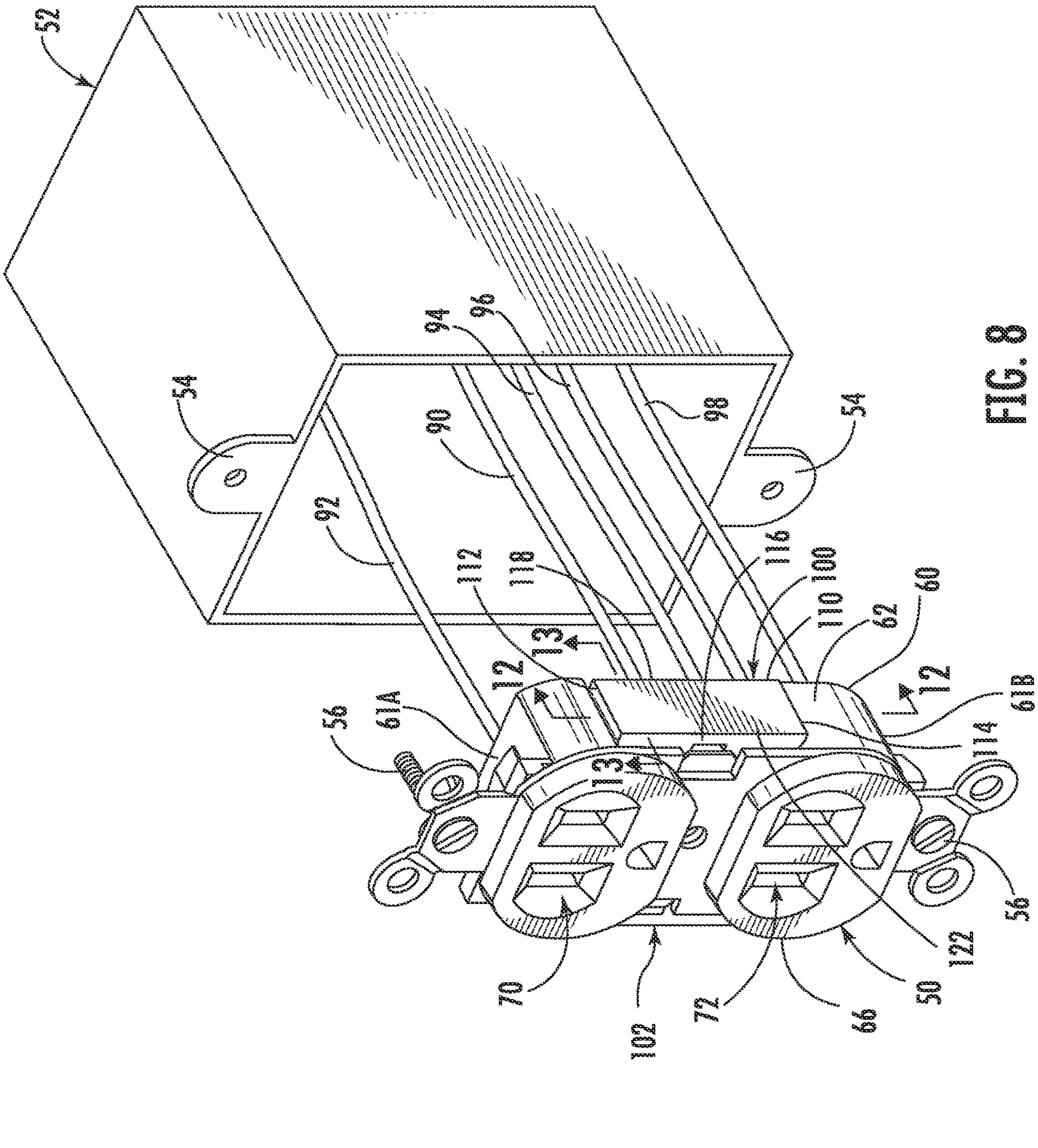
FIGS. 8 and 9 are perspective views corresponding to FIGS. 1 and 2, respectively, illustrating the insulative covers installed for covering the terminals on either side of the electrical device.
Figure 9:
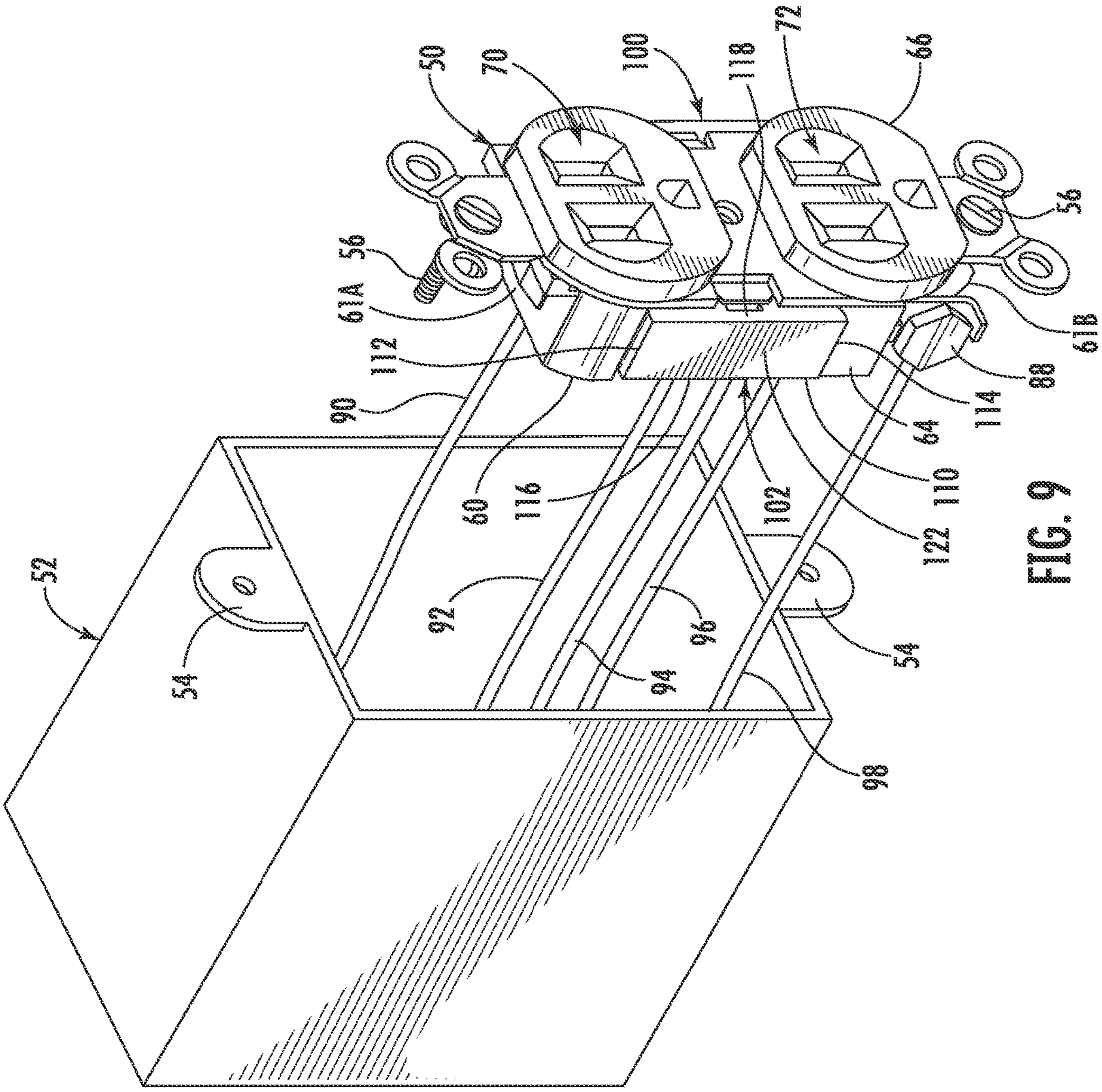
Figure 11:
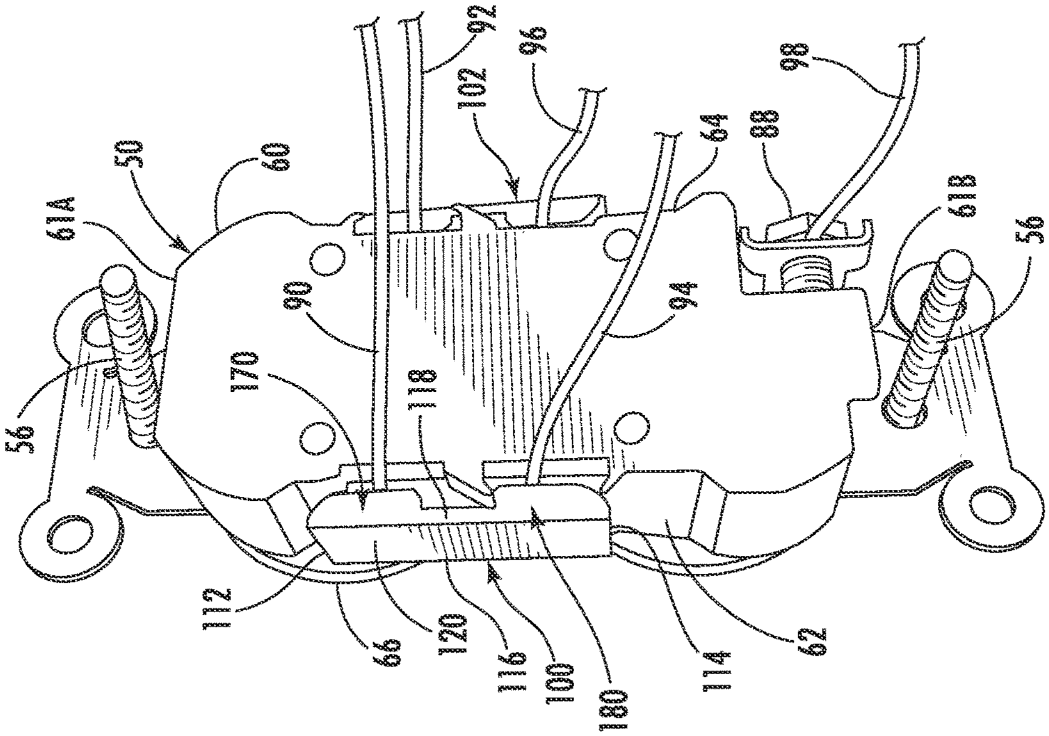
FIGS. 10 and 11 are rear perspective views of the electrical device corresponding to FIGS. 8 and 9, respectively.
Figure 10:
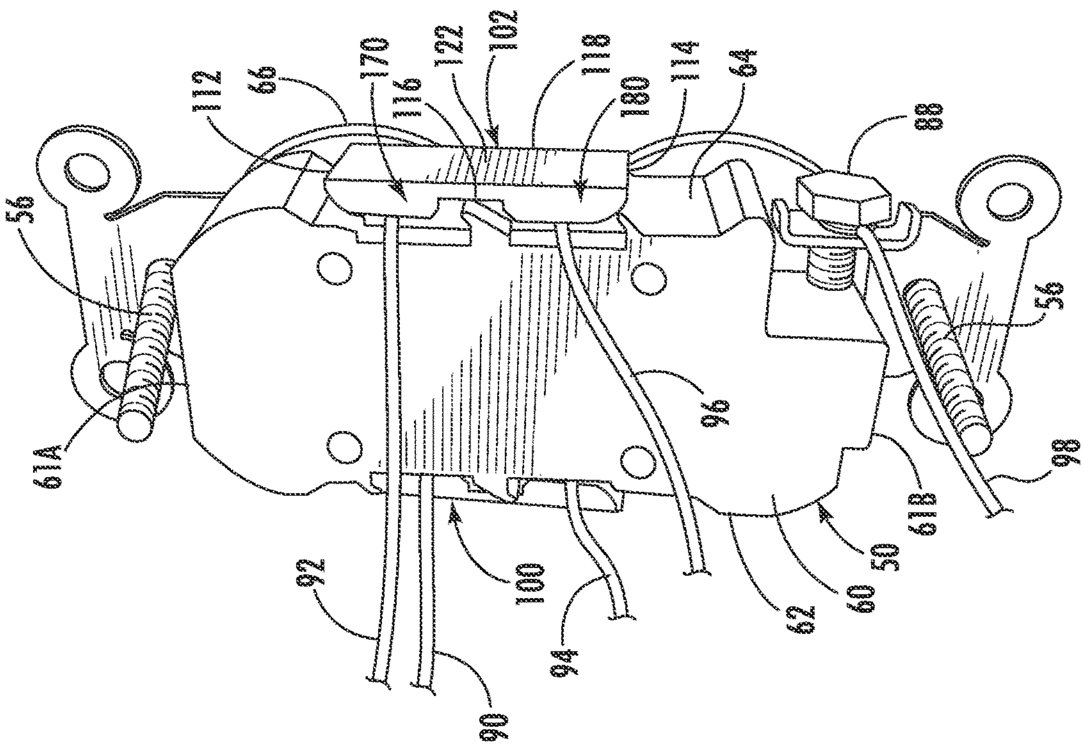

Insulative covers 100 and 102 are identical in every respect. Insulative cover 100 is spaced apart from terminals 80 and 84 on side 62 of electrical device 50 as it would appear positioned for being installed on terminals 80 and 84 in FIGS. 1 and 2. Insulative cover 102 is similarly spaced apart from terminals 82 and 86 on side 64 of electrical device in FIGS. 1 and 2 as it would appear positioned to be installed on terminals 82 and 86. Insulative cover 100 is configured to be concurrently magnetically attached directly to terminals 80 and 84 in FIGS. 8, 10, and 11 for concurrently covering and thereby insulating them, such as from contacting outlet box 52 and an electrician installing, removing, or servicing electrical device 50. Insulative cover 102 is identically configured to be concurrently magnetically attached directly to terminals 82 and 86 in FIGS. 9, 10, and 11 for covering and thereby insulating them, such as from contacting outlet box 52 and an electrician installing, removing, or servicing electrical device 50. Since covers 100 and 102 are identical, the details of cover 100 are discussed below, with the understanding that the ensuing discussion of cover 100 applies in every respect to cover and that covers 100 and 102 bear the same reference characters.

Looking now to FIGS. 3, 4, 5, 6, and 7 in relevant part, cover 100 includes a body 110 of plastic, rubber, ceramic, or other electrically insulative material. Body 110 is of unitary construction, being formed by molding or machining depending on the chosen insulative material and is generally rectangular in overall shape. Body 110 includes opposed parallel ends 112 and 114, comparatively longer opposed parallel sides 116 and 118 extending between ends 112 and 114, inner surface 120, and opposed outer surface 122. Body 110 carries magnetic material 144, here in the form of two identical, unitary magnets 140 and 142. Formed in inner surface 120 of body 110 are two spaced-apart recesses 130 and 132. Recess 130 is proximate to end 112 of body 110, and recess 132 is proximate to end 114 of body 110.

Recesses 130 and 132 are identical, both being circular in this example to accept correspondingly-shaped thin, flat, identical, circular, disk-shaped magnets 140 and 142. Magnets 140 and 142 are set into the respective recesses 130 and 132 and are secured therein adhesively in this example by a suitable adhesive 146. Magnets 140 and 142 relate positionally to the respective terminals 80 and 84. Magnet 140 is exposed at inner surface 120 and open to receiving area 160 defined by profile 170 of body 110 proximate to end 112. Magnet 142 is exposed at inner surface 120 and open to receiving area 162 defined by profile 180 of body 110 proximate to end 114. Like magnets 140 and 142, receiving areas 160 and 162 relate positionally to the respective terminals 80 and 84. Profiles 170 and 180 are the mirror image of one another and each serves as a lateral shield as described below.

Profile 170 projects upright from upper surface 120. Profile 170, which is generally U-shaped, includes end wall 172 and opposed wall 174 and 176 formed along three corresponding sides of magnet 140 to define receiving area 160 over magnet 140. End wall 172 extends along end 112 of body 110 from side 116 to side 118, and opposed, parallel and coextensive mutually respective longitudinally straight walls 174 and 176 extend along part of the respective sides 116 and 118 of body 110 on either side of magnet 140 from either end of end wall 172. Receiving area 160 is sized to accept exposed terminal 80. Since terminals 80 and 84 are identical, receiving area 160 is also inherently sized to accept terminal 84.

Profile 180 projects upright from upper surface 120. Profile 180, which is generally U-shaped, includes end wall 182 and opposed wall 184 and 186 formed along three corresponding sides of magnet 142 to define receiving area 162 over magnet 142. End wall 182 extends along end 114 of body 110 from side 116 to side 118, and opposed, parallel and coextensive mutually respective longitudinally straight walls 184 and 186 extend along part of the respective sides 116 and 118 of body 110 on either side of magnet 142 from either end of end wall 182. Receiving area 162 is sized to accept exposed terminal 84. Since terminals 80 and 84 are identical, receiving area 162 is also inherently sized to accept terminal 80.

Figure 12:
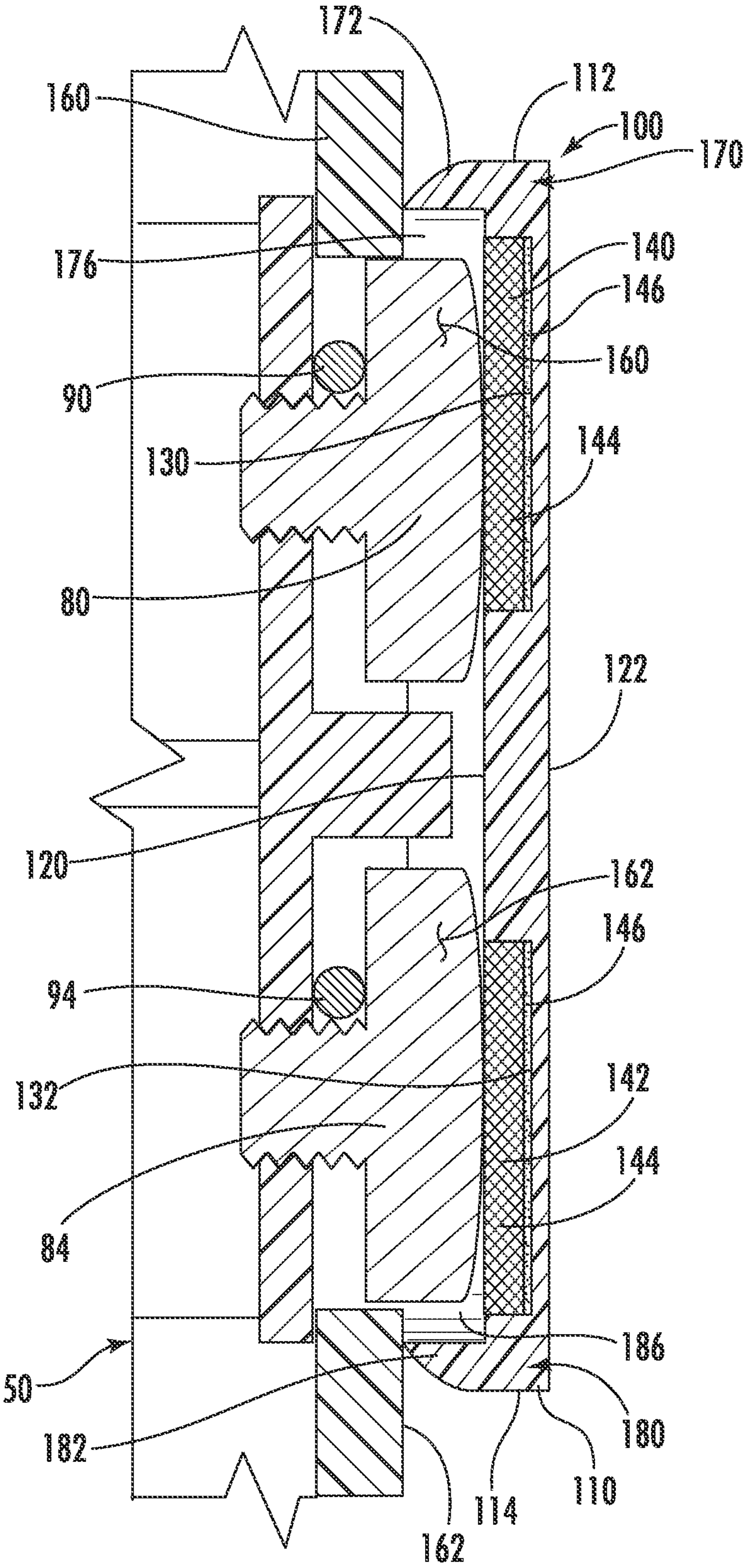
FIG. 12 is a section view taken along line 12-12 of FIG. 8.
Figure 13:
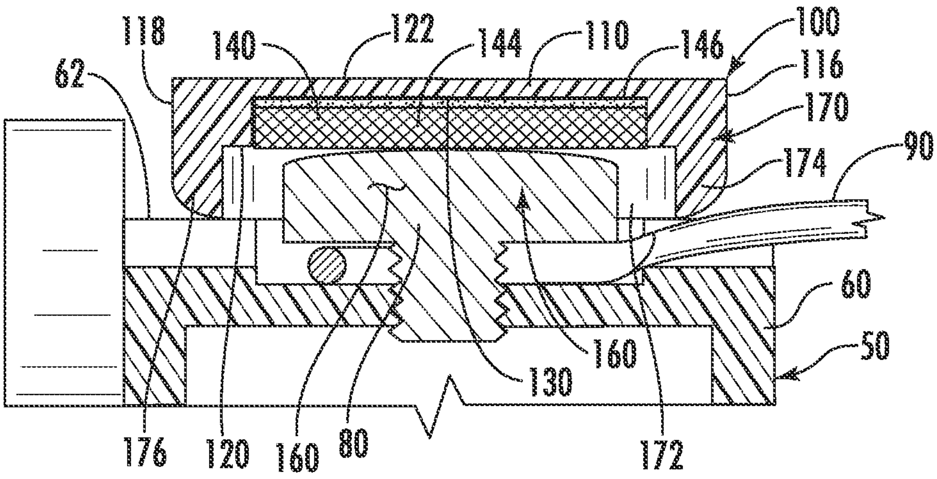
FIG. 13 is a section view taken along line 13-13 of FIG. 8.

Referring in relevant part to FIGS. 1 and 2, cover 100 is assembled by hand with electrical device 50 to concurrently electrically isolate exposed terminals 80 and 84 at side 62 of chassis 60 by positioning cover 100 upright, from end 114 to end 112 in this example, opposite to side 62 of chassis 60 between upper and lower ends 61A and 61B. Inner surface 120 faces side 62 and receiving areas 160 and 162 and magnetic material 144 of corresponding magnets 140 and 142 registers with the respective terminals 80 and 84. Cover 100 is moved toward side 62 of chassis 60 in the direction of arrow A in FIGS. and 2 over terminals 80 and 84 to concurrently cover them FIGS. 8-11. In so doing, terminals 80 and 84 pass into the respective receiving areas 160 and 162 and into direct contact against the respective magnets 140 and 142, locating profiles 170 and 180 over the respective terminals 80 and 84 as shown in relevant part in FIGS. 12 and 13. In FIGS. 12 and 13, profile 170 serves as a shield laterally shielding terminal 80 in receiving area by end wall 72 and walls 174 and 176 from being directly contacted laterally. Identically, profile 180 serves as a shield laterally shielding terminal 84 in receiving area 162 by end wall 182 and walls 184 and 186 from being directly contacted laterally. An inherent magnetic attraction between magnetic material 144 of magnets 140 and 142 and terminals 80 and 84 concurrently magnetically couples magnets 142 and 144 to the respective terminals 80 and 84. This magnetically couples cover 100 to terminals 80 and 84, according to the invention. Terminals 80 and 84, now concurrently covered by the magnetically attached cover 100 positioned between upper and lower ends 61A and 61B of chassis 60 and shielded laterally by the respective profiles 170 and 180 applied over the respective terminals 80 and 84, are concurrently disabled by cover 100 from being touched directly. This forestalls the previously described shorting and electrical shock. Cover 100 is similarly installed by positioning cover 100 upright from end 112 to end 114 and applying cover 100 to terminals 80 and 84 so terminal 80 is received by receiving area 162 and magnetically coupled to magnet 142, and terminal 84 is received by receiving area 160 and magnetically coupled to magnet 140.

Like cover 100, cover 102 is assembled by hand with electrical device 50 to concurrently electrically isolate exposed terminals 82 and 86 at side 64 of chassis 60 by positioning cover 102 upright from end 114 to end 112 opposite to side 64 of chassis 60 between upper and lower ends 61A and 61B. Inner surface 120 faces side 64 and receiving areas 160 and 162 and magnetic material 144 of corresponding magnets 140 and 142 registers with the respective terminals 82 and 86. Cover 102 is moved toward side 64 of chassis 60 in the direction of arrow B in FIGS. 1 and 2 over terminals 82 and 86 to concurrently cover them FIGS. 8-11. In so doing, terminals 82 and 86 pass into the respective receiving areas 160 and 162 and into direct contact against the respective magnets 140 and 142 as described with cover 100 locating profiles 170 and 180 over the respective terminals 82 and 84. As described with cover 100, profile 170 of cover 102 serves as a shield laterally shielding terminal 82 in receiving area 160 by end wall 72 and walls 174 and 176 from being directly contacted laterally. Identically, profile 180 of cover 102 serves as a shield laterally shielding terminal 86 in receiving area 162 by end wall 182 and walls 184 and 186 from being directly contacted laterally. An inherent magnetic attraction between magnetic material 144 of magnets 140 and 142 of cover 102 and terminals 82 and 86 concurrently magnetically couples magnets 142 and 144 to the respective terminals 82 and 86. This magnetically couples cover 102 to terminals 82 and 86 as described with cover 100. Terminals 82 and 86, now concurrently covered by the magnetically attached cover 102 positioned between upper and lower ends 61A and 61B of chassis 60 and shielded laterally by the respective profiles 170 and 180 applied over the respective terminals 82 and 86, are concurrently disabled by cover 102 from being touched directly. This forestalls the previously described shorting and electrical shock. Cover 102 is similarly installed by positioning cover 102 upright from end 112 to end 114 and applying cover 102 to terminals 82 and 86 so terminal 82 is received by receiving area 162 and magnetically coupled to magnet 142, and terminal 86 is received by receiving area 160 and magnetically coupled to magnet 140.

Cover 100 is appropriately sized to cover and electrically isolate terminals 80 and 84 as described herein when cover 100 is magnetically adhered to terminals 80 and 84. Likewise, cover 102 is appropriately sized to cover and electrically isolate terminals 82 and 86 as described herein when cover 102 is magnetically adhered to terminals 82 and 86. Since covers 100 and 102 are configured to adhere magnetically to the respective pairs of terminals, no modification to electrical device 50 or separate fasteners are required to install covers 100 and 102 onto the respective pairs of terminals.

Electrical device 50 configured with the installed covers 100 and 102 in FIGS. 8-11 and hardwired to the building's alternating current power supply may be installed in outlet box 52 as shown in FIGS. 14 and 15 and secured to its standard attachment points 54 with suitable screws 56 according to standard practice without interference from the magnetically-adhered covers 100 and 102. To detach covers 100 and 102 from electrical device 50 when removed from outlet box 52 in FIGS. 8 and 9, covers 100 and 102 need only be taken up by hand and pulled away from the terminals at either side electrical device 50 with sufficient force to overcome the magnetic attraction between magnets 140 and 142 of the respective covers 100 and 102 and the corresponding terminals. Covers 100 and 102 may be used repeatedly as needed.

Magnetic material 144 of each cover 100 and 102 is in the form of two magnets 140 and 142. Magnetic material 144 may be in other forms in alternate embodiments. For example, magnetic material 144 can be a single magnet or more than two magnets configured to magnetically adhere a cover constructed and arranged according to the invention to the corresponding terminals as described herein. Covers 100 and 102 are each configured to connect to and cover two corresponding opposed terminals. A cover can be configured to connect to and cover a single terminal or more than two terminals according to the configuration of the electrical device.

The mechanisms the corresponding pairs of terminals service are the same in electrical device 50 and can be different from one another in alternate embodiments. Although the mechanisms are each a receptacle, each mechanism can be a standard switch or other chosen mechanism as may be desired.

Figure 16:
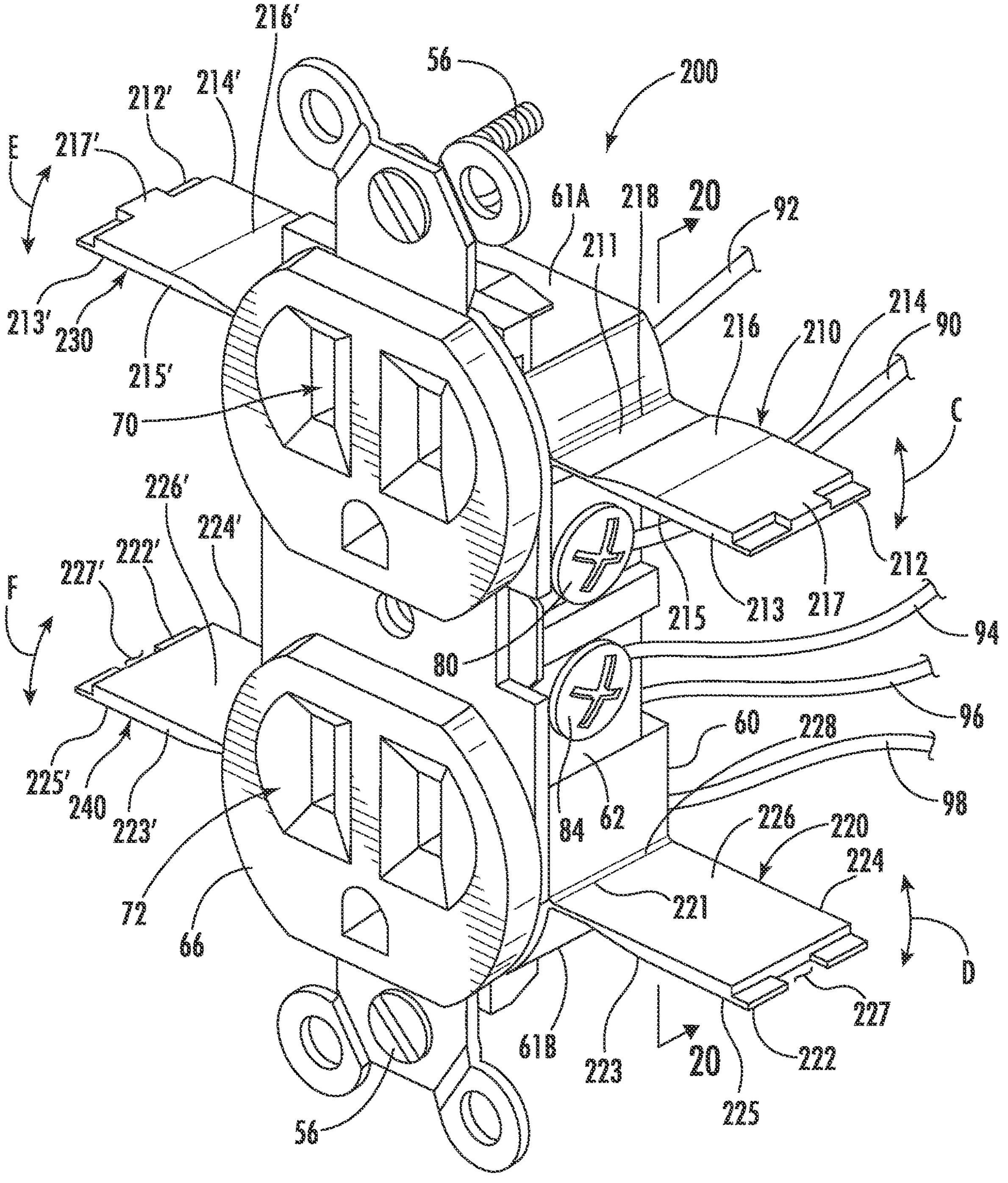
FIGS. 16 and 17 are perspective views illustrating an electrical device having sides configured with electrically wired terminals and insulative convers shown as they would appear open for uncovering the terminals on either side of the electrical device.
Figure 17:
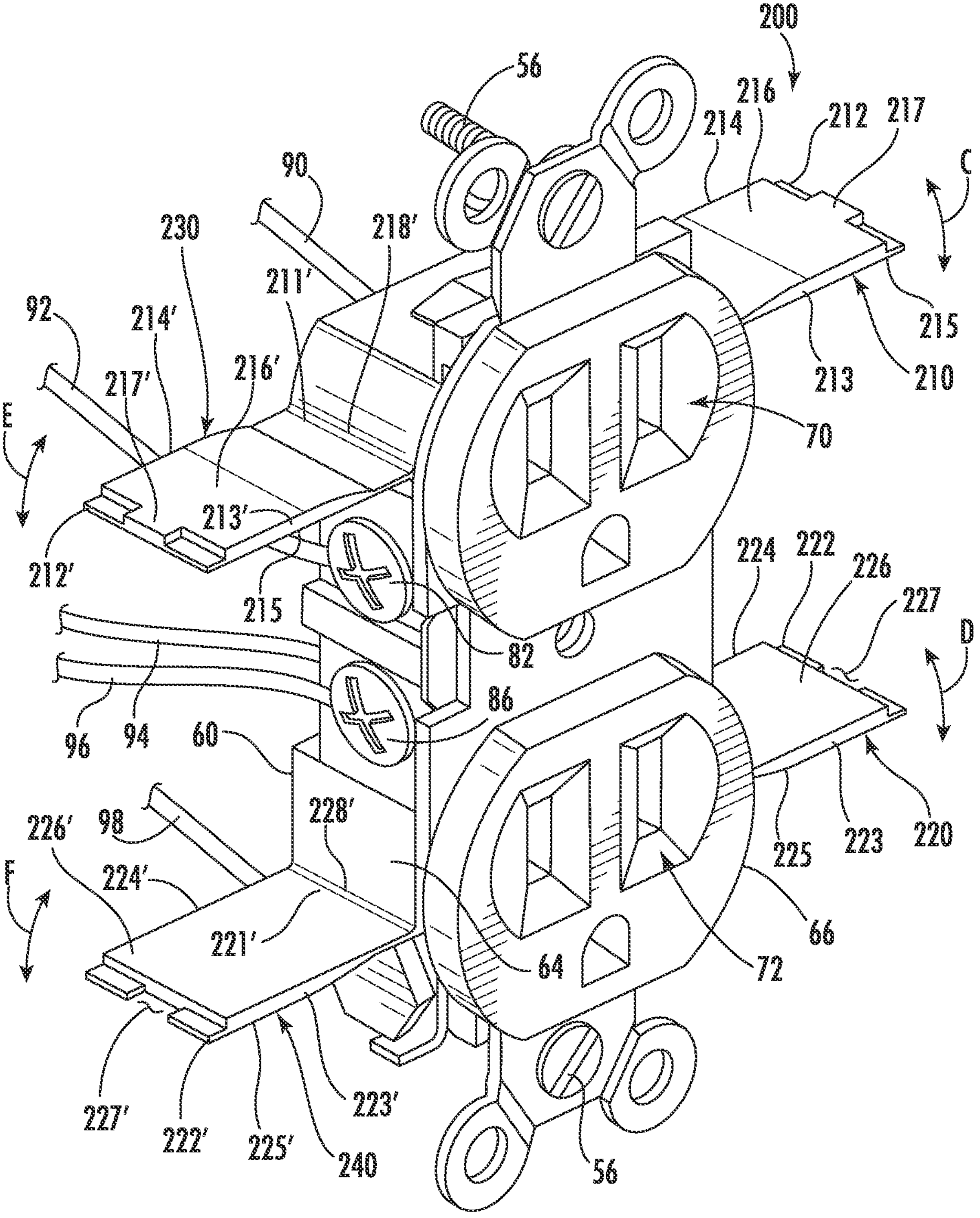
Figure 18:
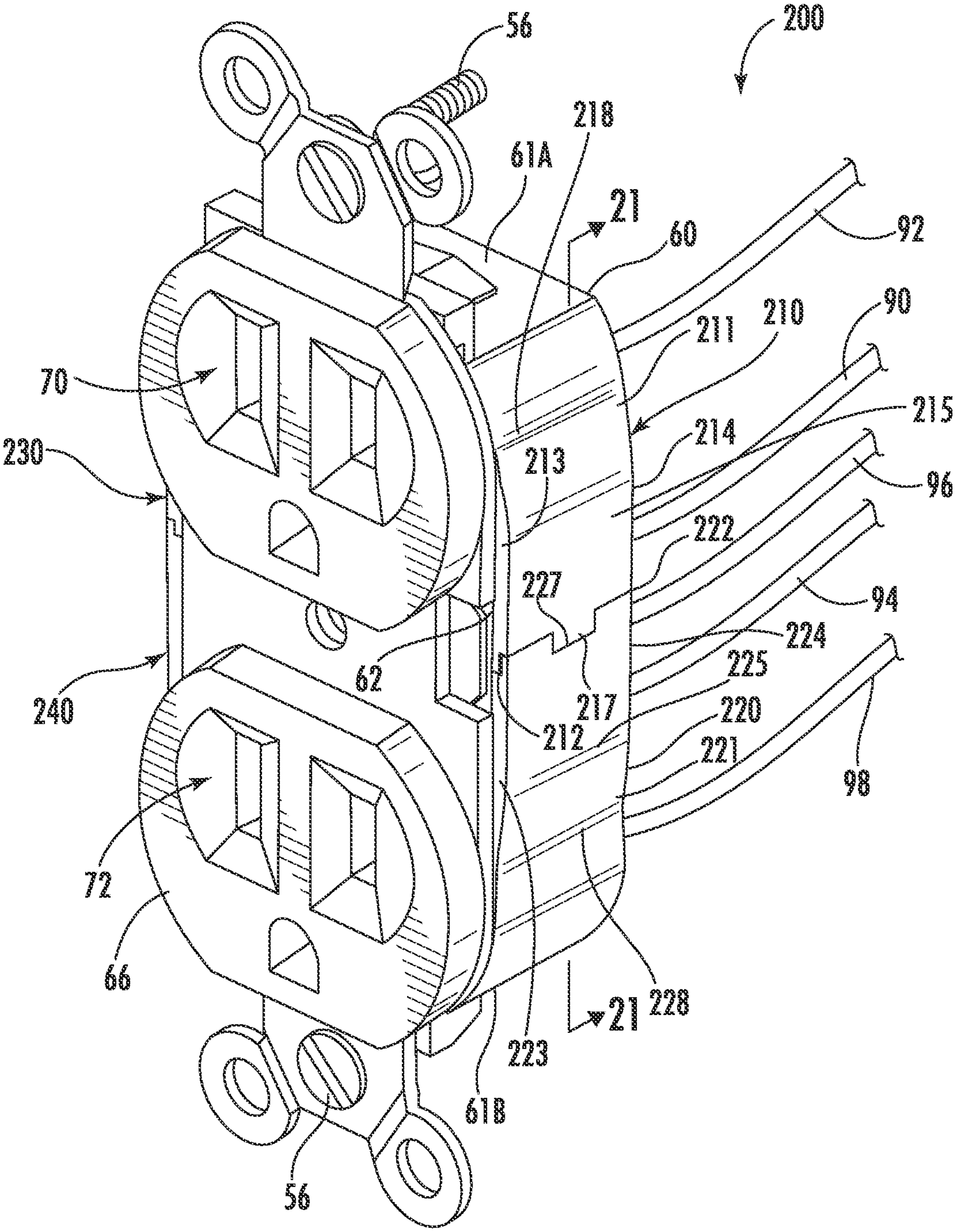
FIGS. 18 and 19 are perspective views corresponding to FIGS. 16 and 17, respectively, illustrating the insulative covers closed for covering the terminals of FIGS. 16 and 17 on either side of the electrical device.

An alternate embodiment of the invention will now be discussed in conjunction with FIGS. 16-23. Illustrated in FIGS. 16 and 17 is electrical device 200. In common with electrical device 50, electrical device 200 shares chassis 60, upper and lower ends 61A and 61B, sides 62 and 64, cover body or face 66 configured sockets 70 and 72, terminals 80 and 82, terminals 84 and 86, ground terminal 88, electrical conductors or wires 90 and 92 hardwired to the respective terminals 80 and 82, electrical conductors or wires 94 and 96 hardwired to the respective terminals 84 and 86, and ground conductor or wire 98 hardwired to ground terminal 88. In this embodiment, electrical device 200 is configured with attached covers 210 and 220 formed of an electrically insulative material and hingedly attached to side 62 of chassis 60, and attached covers 230 and 240 formed of an electrically insulative material and hingedly attached to side 64 of chassis 60. Covers 210 and 220 are movable hingedly between open positions in FIGS. 16 and 17 away from terminals 80 and 84 in FIG. 16 and closed positions in FIG. 18 covering and electrically isolating terminals 80 and 84, not shown in FIG. 18 due to being covered by the respective covers 210 and 220, from contacting an outlet box and an electrician installing, removing, or servicing electrical device 200 to forestall the described inadvertent shorting and electrical shock. Likewise, covers 230 and 240 are movable hingedly between open positions in FIGS. 16 and 17 away from terminals 82 and 86 in FIG. 17 and closed positions in FIG. 19 covering and thereby electrically isolating terminals 82 and 86, not shown in FIG. 19 due to being covered by the respective covers 230 and 240, from contacting an outlet box and an electrician installing, removing, or servicing electrical device 200 to forestall the described inadvertent shorting and electrical shock. Covers 230 and 240 are generally coextensive and are identical to the respective covers 210 and 220. Accordingly, the details of covers 210 and 220 will now be discussed in detail, with the understanding that the ensuing discussion of covers 210 and 220 applies in every respect to the respective covers 230 and 240. Cover 230 bears the same reference characters as cover 210 and include prime ("'") symbols for clarity, and cover 240 bears the same reference characters as cover 232 and include prime ("'") symbols for clarity.

Chassis 60 and covers 210 and 220 are formed of plastic, an inherently electrically insulative material. Referring in relevant part to FIGS. 16-21, cover 210 is a body of unitary construction and is flat and generally rectangular in overall shape. Cover 210 includes opposed parallel proximal/inner and distal/outer ends/extremities 211 and 212, comparatively longer opposed parallel sides 213 and 214 extending between inner and outer ends 211 and 212, outer surface 215, inner surface 216, engagement element 217, and hinge 218. Engagement element 217 carried by cover 210 is formed at outer end 212 at an intermediate location between sides 213 and 214. Hinge 218 hingedly connects inner end 211 to side 62 of chassis 60 between upper end 61A and terminal 80. Cover 210 turns/pivots on hinge 218 in the directions indicated by double-arrow C in FIGS. 16, 17, and 20 between its open position in FIGS. 16, 17, and 20, in which cover 210 is pivoted away from side 62 and terminal 80 in FIGS. 16 and 20, and its closed position in FIGS. 18 and 21, in which cover 210 is pivoted toward side 62 and terminal 80 in FIG. 21 covering terminal 80 by its inner surface 216. In this example, hinge 218 is a living hinge, a thin flexible hinge, i.e. a flexure bearing, made from the same material as chassis and cover 210 it connects. Hinge 218 is typically thinned or cut to allow cover 210 to bend along the line of hinge 218. The minimal friction and very little wear in hinge 218 are inherently useful and inexpensive in the design of electrical device 200. Cover 210 is easily and repeatedly pivoted by hand between its open and closed positions.

Referring in relevant part to FIGS. 16-21, cover 220 is a body of unitary construction and is flat and generally rectangular in overall shape. Cover 220 includes opposed parallel proximal/inner and distal/outer ends/extremities 221 and 222, comparatively longer opposed parallel sides 223 and 224 extending between inner and outer ends 221 and 222, outer surface 225, inner surface 226, engagement element 227, and hinge 228. Complemental engagement element 227 carried by cover 220 is formed at outer end 222 at an intermediate location between sides 223 and 234 and is configured to engage engagement element 217 of cover 210 detachably. Hinge 228 hingedly connects inner end 221 to side 62 of chassis 60 between lower end 61B and terminal 84. Cover 220 turns/pivots on hinge 228 in the directions indicated by double-arrow D in FIGS. 16, 17, and 20 between its open position in FIGS. 16, 17, and 20, in which cover 220 is pivoted away from side 62 and terminal 84 in FIGS. 16 and 20, and its closed position in FIGS. 18 and 21, in which cover 220 is pivoted toward side 62 and terminal 84 in FIG. 21 covering terminal 84 by its inner surface 226. In this example, hinge 228 is a living hinge, a thin flexible hinge, i.e. a flexure bearing, made from the same material as chassis 60 and cover 220 it connects. Hinge 228 is typically thinned or cut to allow cover 220 to bend along the line of hinge 228. The minimal friction and very little wear in hinge 228 are inherently useful and inexpensive in the design of electrical device 200. Cover 220 is easily and repeatedly pivoted by hand between its open and closed positions.

Covers 210 and 220 pivot between their open and closed positions independently from one another. When covers 210 and 220 are concurrently pivoted to their closed positions in FIGS. 18 and 21, the closed cover 210 independently covers terminal 80, and the closed cover 220 independently covers terminal 84. When covers 210 and 220 cover the respective terminals 80 and 84, terminals 80 and 84 are disabled by the respective covers 210 and 220 from being touched directly. This forestalls the previously described shorting and electrical shock. Outer ends 212 and 222 meet and overlap at an intermediate position between terminals 80 and 84, and engagement element 217 of cover registers with complemental engagement element 227 of cover 220. Engagement element 217 and complemental engagement element 227 are configured to engage one another detachably to releasably secure covers 210 and 220 in their closed positions. In this example, engagement element 217 is a male engagement element in the form of a tongue formed in the material of cover 210, and complemental engagement element 227 is a corresponding female engagement element in the form of a notch formed in the material of cover 220. Engagement element 217 is detachably engaged to complemental engagement element 227 when covers 210 and 220 are concurrently pivoted to their closed positions by pressing them together. This frictionally secures them together detachably concurrently securing covers 210 and 220 in their closed positions. When engagement element 217 and complemental engagement element 227 are released from one another, covers 210 and 220 are free to turn about their respective hinges 218 and 228 between their open and closed positions. When engagement element 217 and complemental engagement element 227 are detachably secured to one another when covers 210 and 220 are in their closed positions, covers 210 and 220 are restricted from turning about their respective hinges 218 and 228 out of their closed positions. When engagement element 217 and complemental engagement element 227 are detachably secured to one another when covers 210 and 220 are in their closed positions, covers 210 and 220 cover the respective terminals 80 and 84 disabling them from being touched directly. This forestalls the previously described shorting and electrical shock. Although engagement element 217, the tongue, is carried by cover 210 and the complemental engagement element 227, the corresponding notch, is carried by cover 220, this arrangement can be reversed. Corresponding hook-and-loop fasteners, complementing snap fasteners, or the like can be used form engagement and complemental engagement elements 217 and 227 in alternate embodiments.

Figure 19:
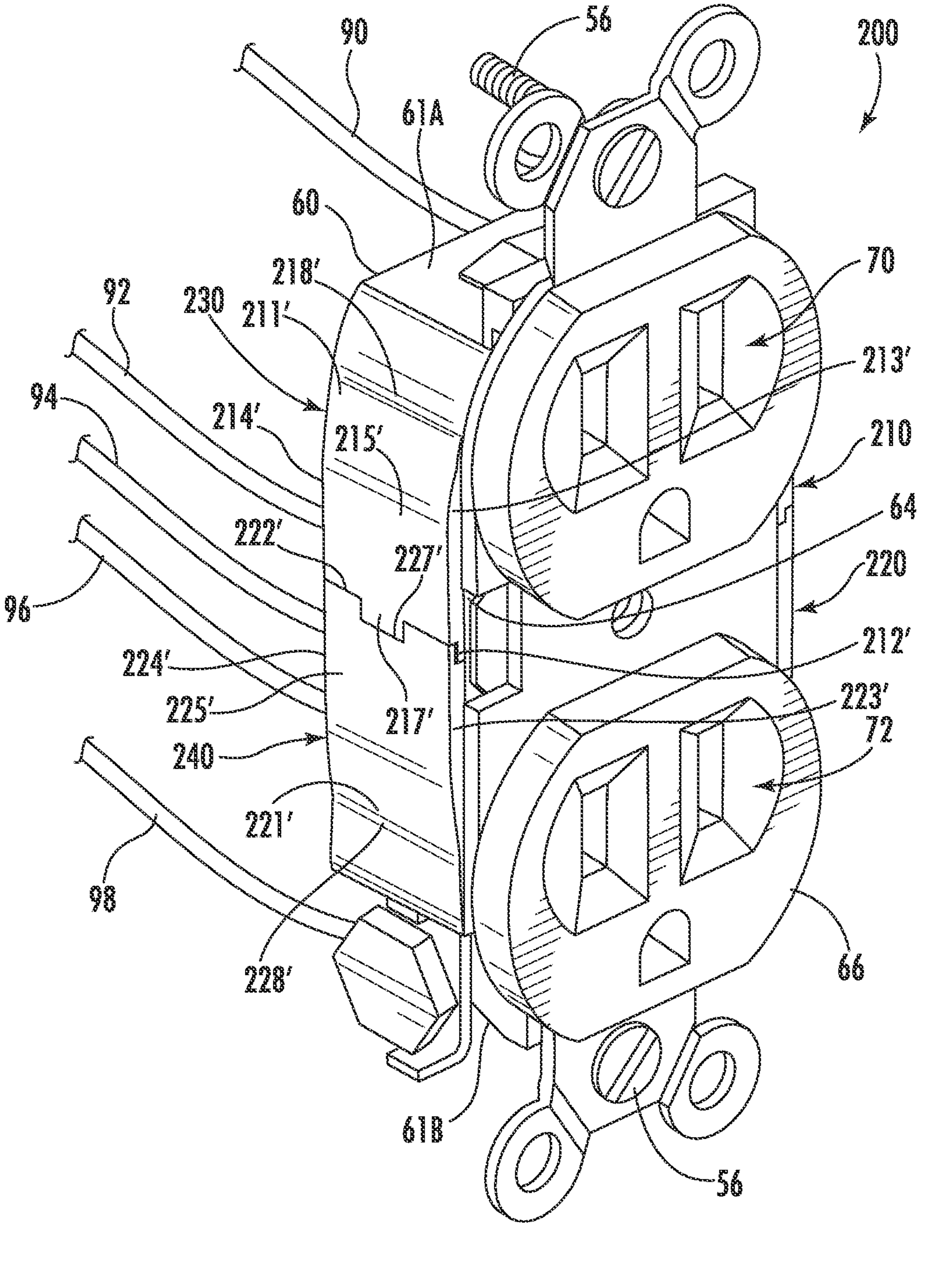
Figure 20:
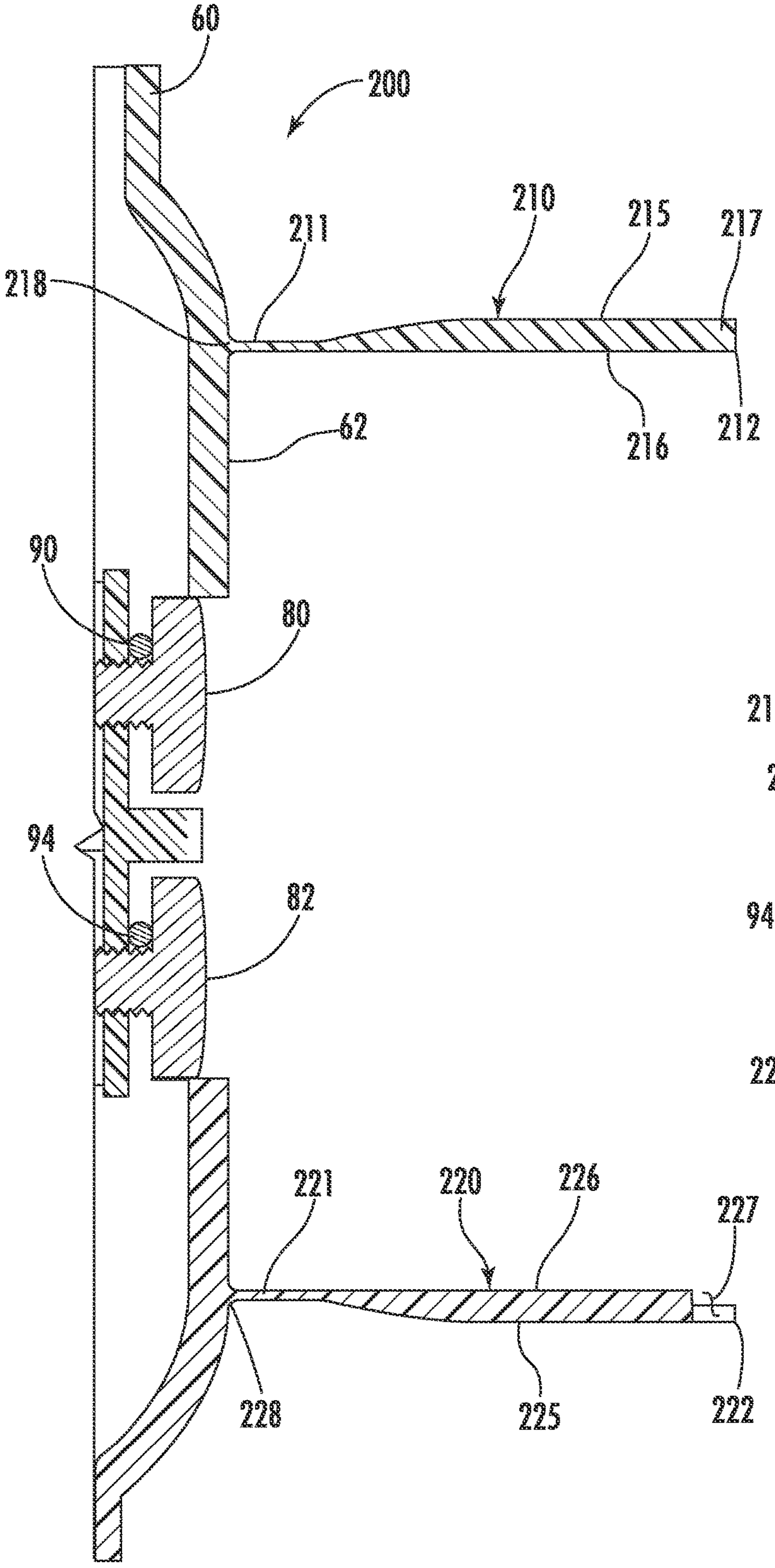
FIG. 20 is a section view taken alone line 20-20 of FIG. 16.
Figure 21:
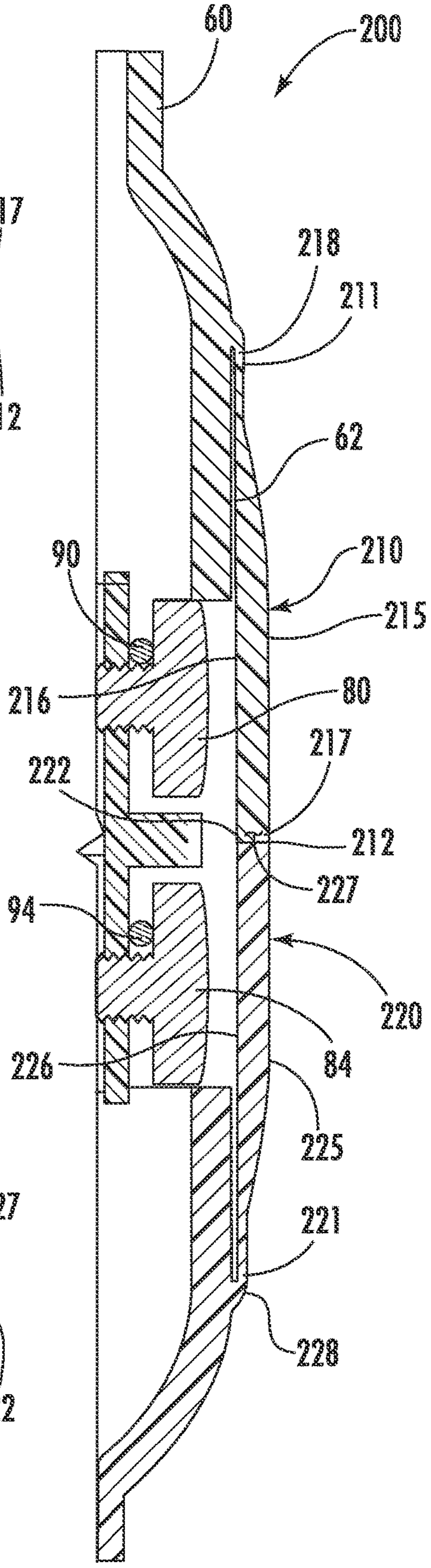
FIG. 21 is a section view taken alone line 21-21 of FIG. 18.
Figure 22:
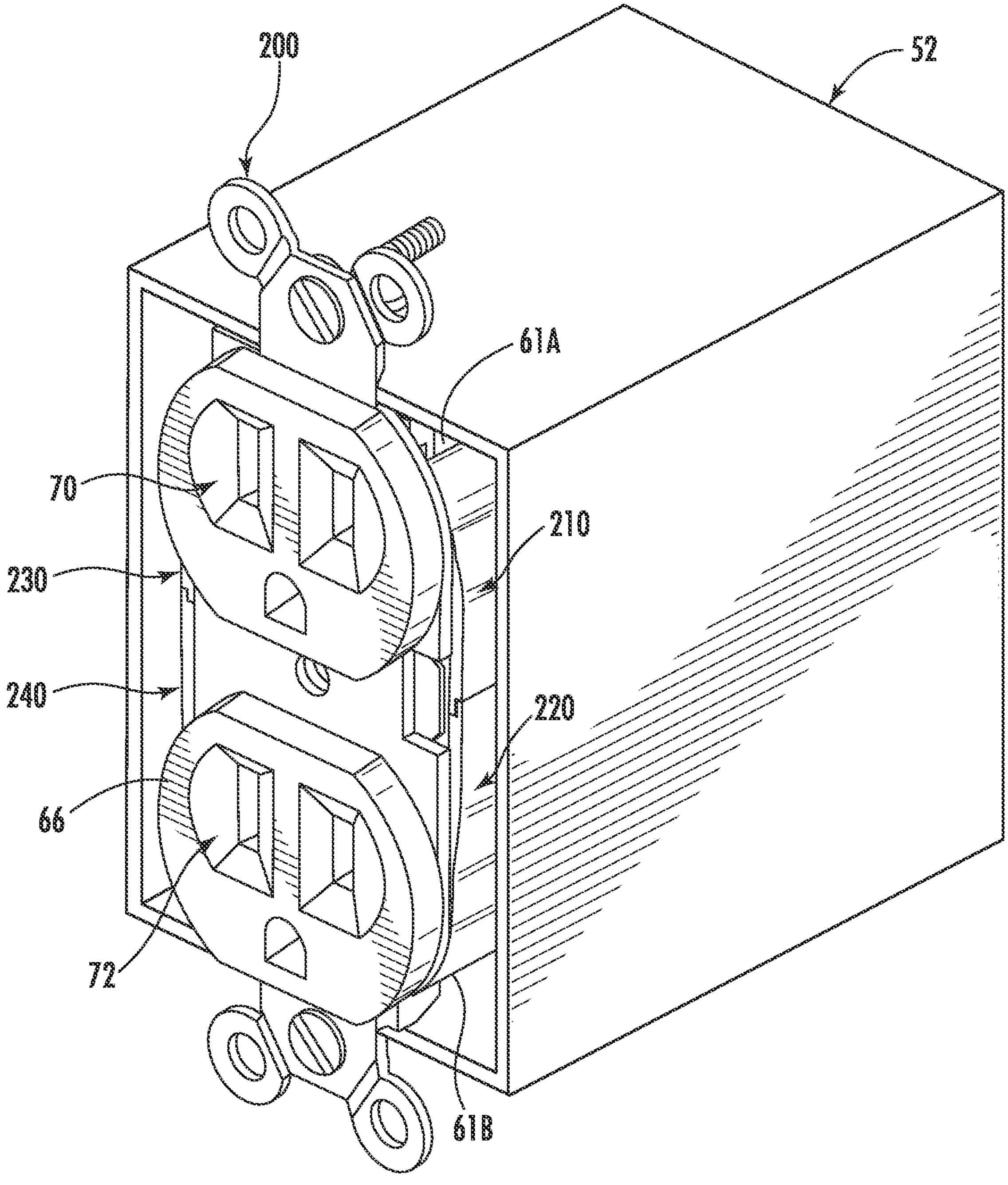
FIGS. 22 and 23 are perspective views corresponding to FIGS. 18 and 19, respectively, illustrating the electrical device mounted in the junction box.

Covers 230 and 240 work with terminals 82 and 86 at side 64 of chassis 60 in the same way covers 210 and 220 work with terminals 80 and 84 at side 64 of chassis 60. Referring in relevant part to FIGS. 16, 17, and 19, cover 230 is identical to cover 210 in that cover 230 shares inner and outer ends 211' and 212', sides 213' and 214', outer surface 215', inner surface 216', engagement element 217', and hinge 218'. Hinge 218' hingedly connects inner end 211' to side 64 of chassis 60 between upper end 61A and terminal 82. Cover 230 turns/pivots on hinge 218' in the directions indicated by double-arrow E in FIGS. 16 and 17 between its open position in FIGS. 16 and 17, in which cover is pivoted away from side 64 and terminal 82 in FIG. 17, and its closed position in FIG. 19, in which cover 230 is pivoted toward side 64 in FIG. 19 and terminal 82 covering terminal 82 by its inner surface 216'. Terminal 82 is not shown in FIG. 19 because it is covered by cover 230. Cover 230 is easily and repeatedly pivoted by hand between its open and closed positions.

Cover 240 is identical to cover 220 in that cover 240 shares inner and outer ends 221' and 222', sides 223' and 224', outer surface 225', inner surface 226', engagement element 227', and hinge 228'. Hinge 228' hingedly connects inner end 221' to side 64 of chassis 60 between lower end 61B and terminal 86. Cover 240 turns/pivots on hinge 248' in the directions indicated by double-arrow F in FIGS. 16 and 17 between its open position in FIGS. 16 and 17, in which cover 240 is pivoted away from side 64 and terminal 86 in FIG. 17, and its closed position in FIG. 19, in which cover 240 is pivoted toward side 64 in FIG. 19 and terminal 86 covering terminal 86 by its inner surface 226'. Terminal 86 is not shown in FIG. 19 because it is covered by cover 234. Cover 240 is easily and repeatedly pivoted by hand between its open and closed positions.

Covers 230 and 240 pivot between their open and closed positions independently from one another. Like covers 210 and 220, when covers 230 and 240 are concurrently pivoted to their closed positions in FIG. 19, the closed cover 230 independently covers terminal 82, and the closed cover 240 independently covers terminal 86. When covers 230 and 240 cover the respective terminals 82 and 86, terminals 82 and 86 are disabled by the respective covers 230 and 240 from being touched directly. This forestalls the previously described shorting and electrical shock. Also, outer ends 212' and 222' meet and overlap at an intermediate position between terminals 82 and 86, and engagement element 217' of cover 230 registers with complemental engagement element 227' of cover 240. Engagement element 217' and complemental engagement element 227' are configured to detachably engage one another to releasably secure covers 230 and 240 in their closed positions. In this example, engagement element 217' is the male engagement element in the form of the tongue formed in the material of cover 230, and complemental engagement element 227' is the corresponding female engagement element in the form of the notch formed in the material of cover 240. To detachably engage engagement element 217' to complemental engagement element 227' when covers 230 and 240 are concurrently pivoted to their closed positions, engagement element 217', the tongue, and the complemental engagement element 227', the corresponding notch, need only be pressed together to frictionally secure them together thereby concurrently securing covers 230 and 240 in their closed positions. When engagement element 217' and complemental engagement element 227' are released from one another, covers 230 and 240 are free to turn about their respective hinges 218' and 228' between their open and closed positions. When engagement element 217' and complemental engagement element 227' are detachably secured to one another when covers 230 and 240 are in their closed positions, covers 230 and 240 are restricted from turning about their respective hinges 218' and 228' out of their closed positions. When engagement element 217' and complemental engagement element 227' are detachably secured to one another when covers 230 and 240 are in their closed positions, covers 230 and 240 cover the respective terminals 82 and 86 disabling them from being touched directly. This forestalls the previously described shorting and electrical shock. Although engagement element 217', the tongue, is carried by cover 230 and the complemental engagement element 227', the corresponding notch, is carried by cover 240, this arrangement can be reversed. Corresponding hook-and-loop fasteners, complementing snap fasteners, or the like can be used form engagement and complemental engagement elements 217' and 227' in alternate embodiments.

Figure 23:
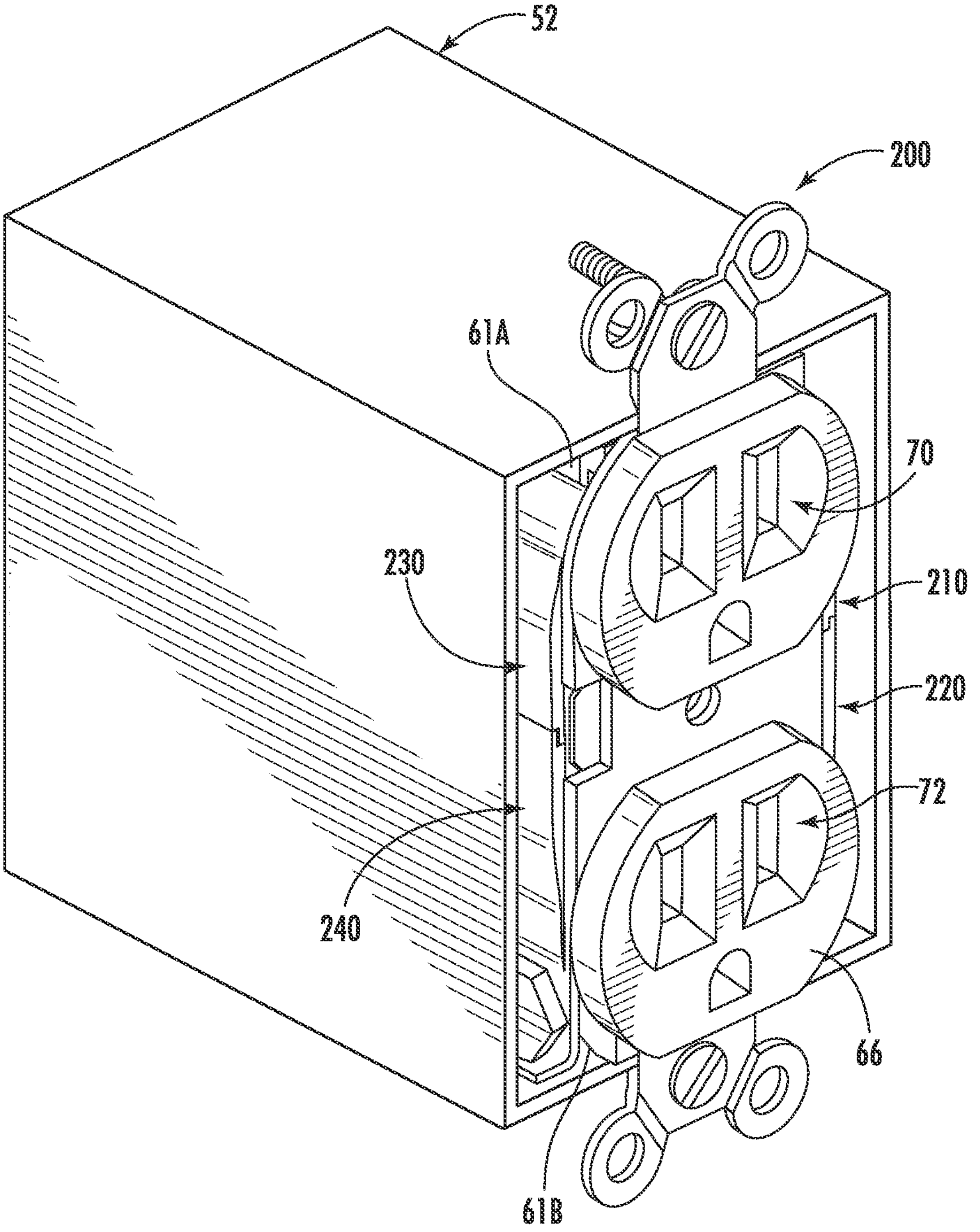

Covers 210 and 220 are appropriately sized to cover and electrically isolate terminals 80 and 84 as described herein when covers 210 and 220 are secured in their closed positions. Likewise, covers 230 and 240 are appropriately sized to cover and electrically isolate terminals 82 and 86 as described herein when covers 230 and 240 are secured in their closed positions. Electrical device 200 configured with covers 210 and 220 secured in their closed positions and covers 230 and 240 in their closed positions and hardwired to a building's alternating current power supply may be installed in outlet box 52 as shown in FIGS. 23 and 24 and secured to its standard attachment points 54 with suitable screws 56 according to standard practice without interference from covers 210, 220, 230 and 240. To move covers 210 and 220 out of their closed positions when electrical device 200 is removed from the outlet, outer ends 212 and 222 of the respective covers 210 and 220 need only be pulled apart to release engagement element 217 from complemental engagement element 227. Covers 210 and 220 may then be pivoted by hand out of their closed positions to their open positions. To similarly move covers 230 and 240 out of their closed positions when electrical device 200 is removed from the outlet, outer ends 212' and 222' of the respective covers 230 and 240 need only be pulled apart to release engagement element 217' from complemental engagement element 227'. Covers 230 and 240 may then be pivoted by hand out of their closed positions to their open positions.

The mechanisms the corresponding pairs of terminals service are the same in electrical device 200 and can be different from one another in alternate embodiments. Although the mechanisms are each a receptacle, each mechanism can be a standard switch or other chosen mechanism as may be desired.

The present invention is described above with reference to illustrative embodiments. However, those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. An electrical device, comprising:

a chassis having an upper end, a lower end, a side extending between the upper end and the lower end, and a terminal, the terminal is on the side between the upper end and the lower end, exposed and configured to be hardwired by a wire to a power source for powering the electrical device; and a cover formed of an electrically insulative material, the cover connected by a hinge to the side between the upper end and the lower end for repeated movement between an open position away from the terminal and a closed position over the terminal, covering and electrically isolating the terminal, wherein the wire extends outward from the terminal under the cover and the side between the upper end and the lower end when the terminal is hardwired by the wire to the power source and the cover is in the closed position.

2. The electrical device of claim 1, wherein the hinge comprises a living hinge.

3. The electrical device of claim 1, wherein the terminal comprises a screw-type terminal.

4. An electrical device, comprising:

a chassis having an upper end, a lower end, a side extending between the upper end and the lower end, a first terminal, and a second terminal, the first terminal and the second terminal are on the side between the first end and the second end, exposed, and configured to be hardwired by a first wire and a second wire, respectively, to a power source for powering the electrical device;

a first cover formed of an electrically insulative material, the first cover connected by a first hinge to the side between the upper end and the first terminal for repeated movement between an open position away from the first terminal and a closed position over the first terminal, covering and electrically isolating the first terminal, wherein the first wire extends outward from the first terminal under the first cover and the side between the upper end and the lower end when the first terminal is hardwired by the first wire to the power source and the first cover is in the closed position; and a second cover formed of an electrically insulative material, the second cover connected by a second hinge to the side between the lower end and the second terminal for repeated movement between an open position away from the second terminal and a closed position over the second terminal, covering and electrically isolating the second terminal, wherein the second wire extends outward from the second terminal under the second cover and the side between the upper end and the lower end when the second terminal is hardwired by the second wire to the power source and the second cover is in the closed position.

5. The electrical device according to claim 4, wherein the first hinge is a living hinge.

6. The electrical device according to claim 4, wherein the second hinge is a living hinge.

7. The electrical device of claim 4, wherein the first terminal and the second terminal each comprise a screw-type terminal.

8. The electrical device according to claim 4, further comprising:

an engagement element carried by the first cover;

a complemental engagement element carried by the second cover; and the engagement element configured to detachably engage the complemental engagement element when the first cover and the second cover are in the closed positions thereof.

9. The electrical device according to claim 8, wherein:

the first cover includes a proximal extremity connected by the first hinge to the side and a distal extremity;

the second cover includes a proximal extremity connected by the second hinge to the side and a distal extremity;

the engagement element is carried by the first cover proximate to the distal extremity thereof; and the complemental engagement element is carried by the second cover proximate to the distal extremity thereof.

* * * * *